(12) United States Patent
Kim et al.

(10) Patent No.: US 12,444,975 B2
(45) Date of Patent: Oct. 14, 2025

(54) WIRELESS CHARGING APPARATUS THAT CAN SUPPORT USER TERMINAL IN VARIOUS DIRECTIONS AND AT VARIOUS ANGLES

(71) Applicant: LG ELECTRONICS INC., Seoul (KR)

(72) Inventors: Kyunghwan Kim, Seoul (KR); Seong Hun Lee, Ulju-gun (KR); Gyunghwan Yook, Seoul (KR); Hyoung Seok Kim, Seoul (KR); Hwanyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 756 days.

(21) Appl. No.: 17/790,260

(22) PCT Filed: Dec. 30, 2019

(86) PCT No.: PCT/KR2019/018737
§ 371 (c)(1),
(2) Date: Jun. 30, 2022

(87) PCT Pub. No.: WO2021/137312
PCT Pub. Date: Jul. 8, 2021

(65) Prior Publication Data
US 2023/0044514 A1    Feb. 9, 2023

(51) Int. Cl.
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC .................................................. H02J 50/005
(Continued)

(56) References Cited

U.S. PATENT DOCUMENTS

| 2013/0225077 A1* | 8/2013 | Schultz | H04B 5/79 455/41.1 |
| 2015/0077927 A1 | 3/2015 | Barnett et al. | |

(Continued)

FOREIGN PATENT DOCUMENTS

| JP | 2014-79053 A | 5/2014 |
| KR | 10-2015-0069254 A | 6/2015 |

(Continued)

OTHER PUBLICATIONS

Saha et al., "Wireless power transfer using relay resonators", Applied Physics Letters, vol. 112, No. 263902, 2018, pp. 1-5.

*Primary Examiner* — Yalkew Fantu
(74) *Attorney, Agent, or Firm* — Birch, Stewart, Kolasch & Birch, LLP

(57) ABSTRACT

Discussed is a wireless charging device that changes a direction of a magnetic field generated by a transmission coil, through a repeater capable of rotating in a plane, and supports a user terminal in parallel with the repeater, to wirelessly transmit power in various directions and at various angles. The wireless charging device includes a power transmitting module including a plurality of transmission coils arranged side by side, therein, a terminal supporting module including a repeater therein and disposed at a slant with respect to an upper surface of the power transmitting module on the upper surface of the power transmitting module, a moving module to move the terminal supporting module along a direction in which the transmission coils are arranged, and a controller to supply a voltage to any one of the plurality of transmission coils depending on a position of the moving module.

20 Claims, 19 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2018/0124959 A1* | 5/2018 | Saab | ........................ H04B 5/79 |
| 2018/0301933 A1* | 10/2018 | Lee | ........................ H02J 50/90 |
| 2018/0358826 A1 | 12/2018 | Allen et al. | |
| 2020/0083726 A1 | 3/2020 | Kim et al. | |

FOREIGN PATENT DOCUMENTS

| | | |
|---|---|---|
| KR | 10-2017-0054708 A | 5/2017 |
| KR | 10-2017-0130230 A | 11/2017 |
| KR | 10-2018-0074372 A | 7/2018 |
| KR | 10-1944856 B1 | 2/2019 |

* cited by examiner

[FIG. 1]
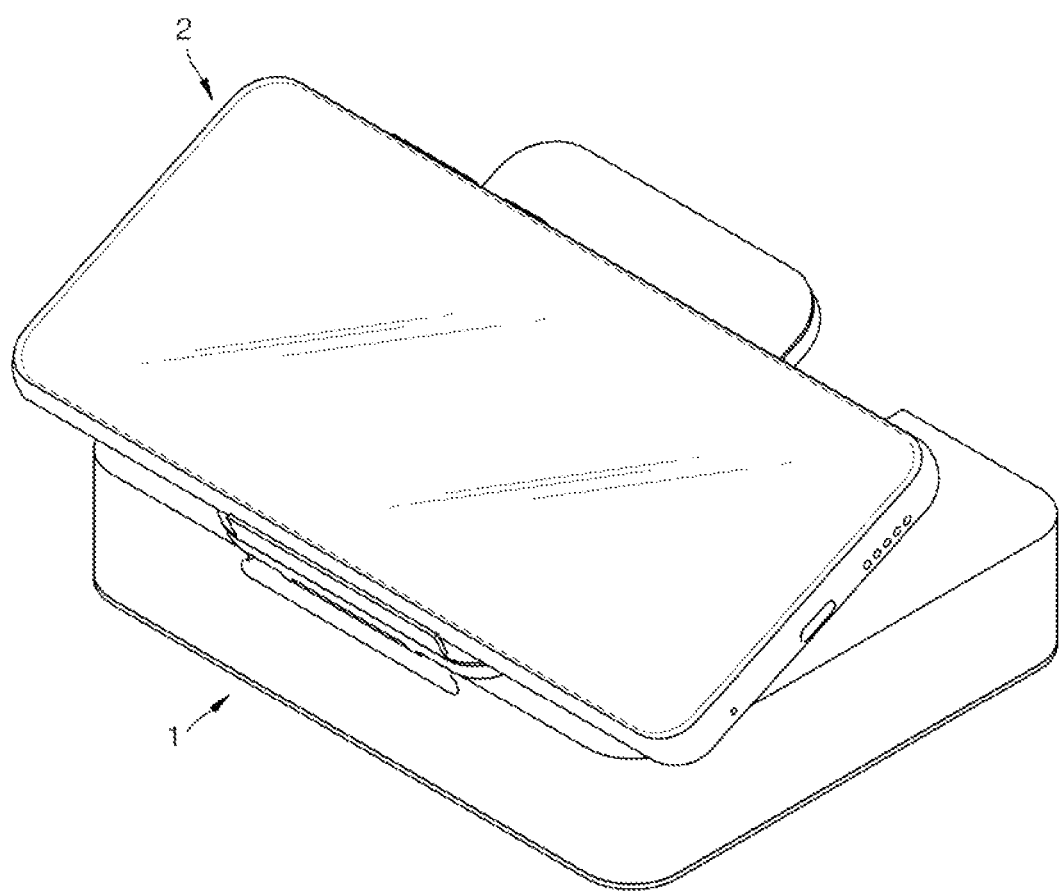

[FIG. 2]
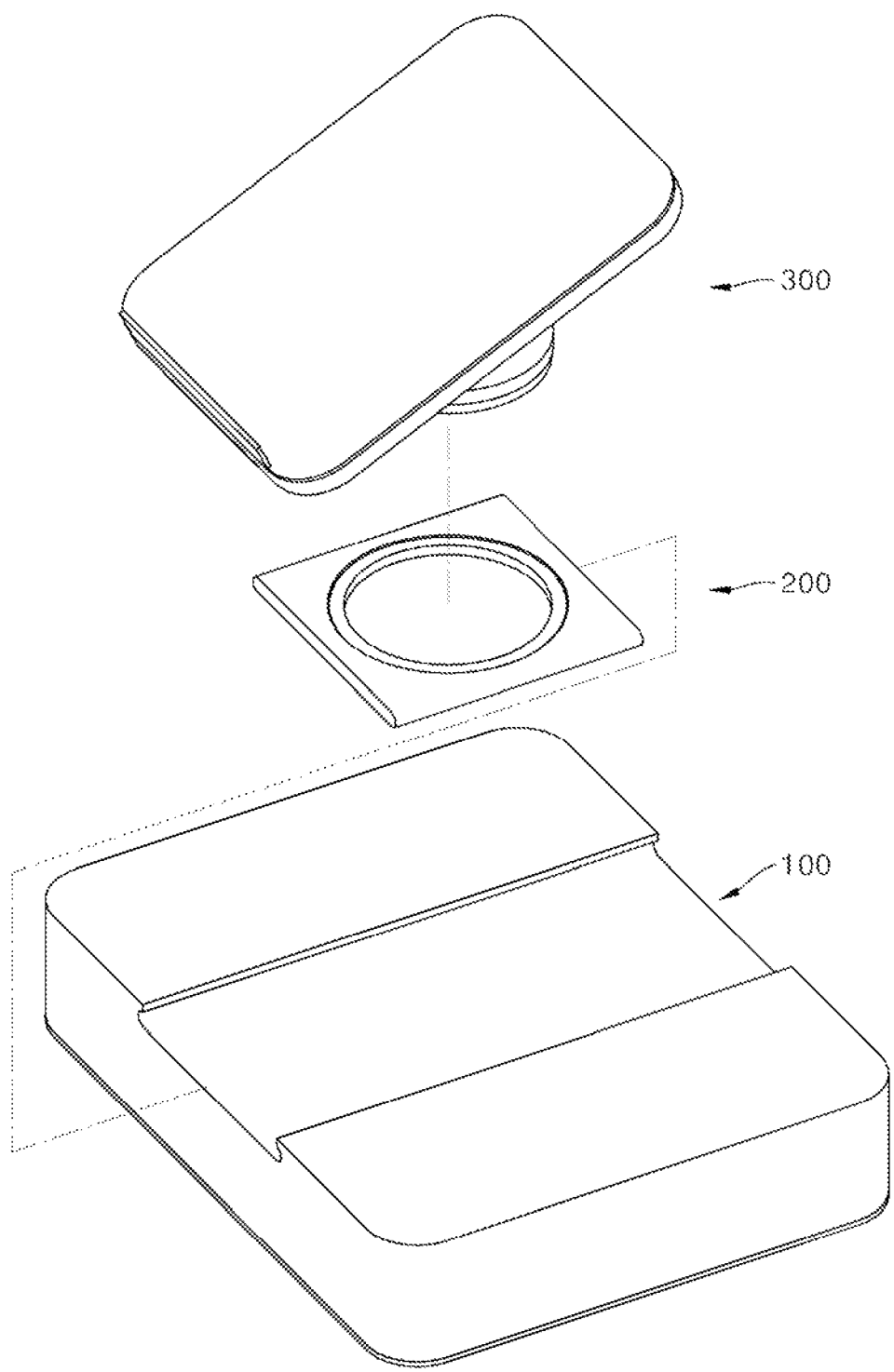

[FIG. 3]
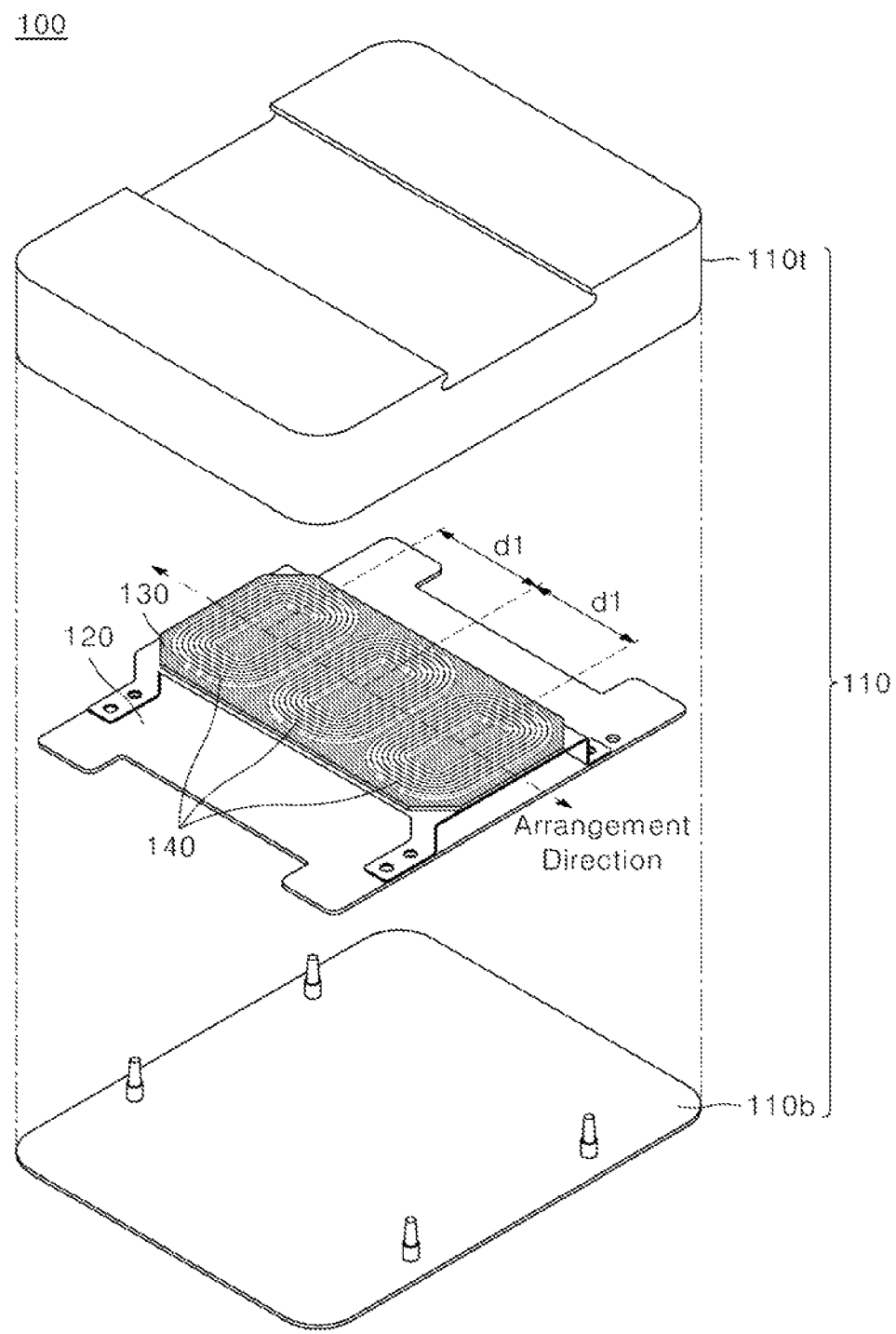

[FIG. 4]
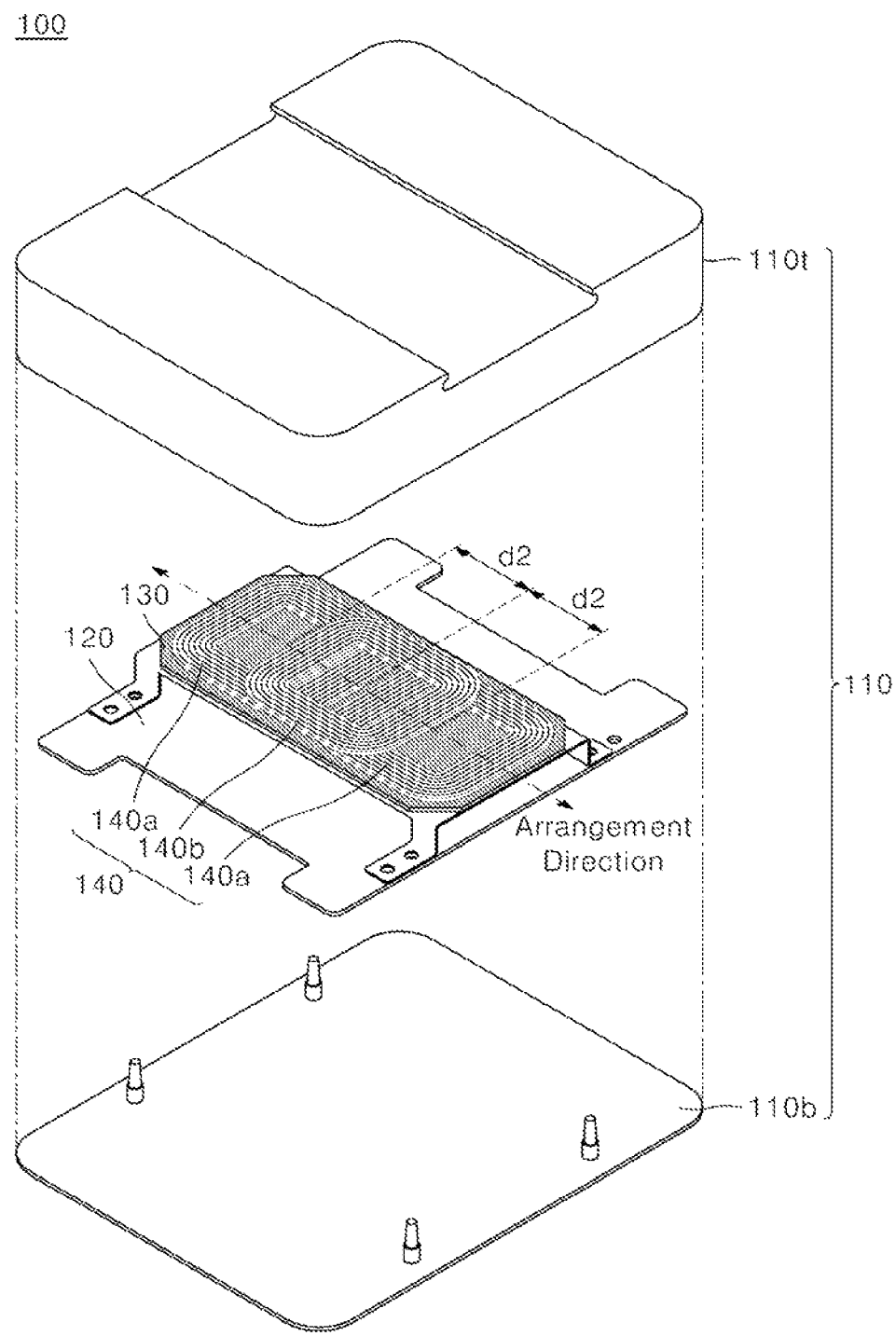

[FIG. 5]
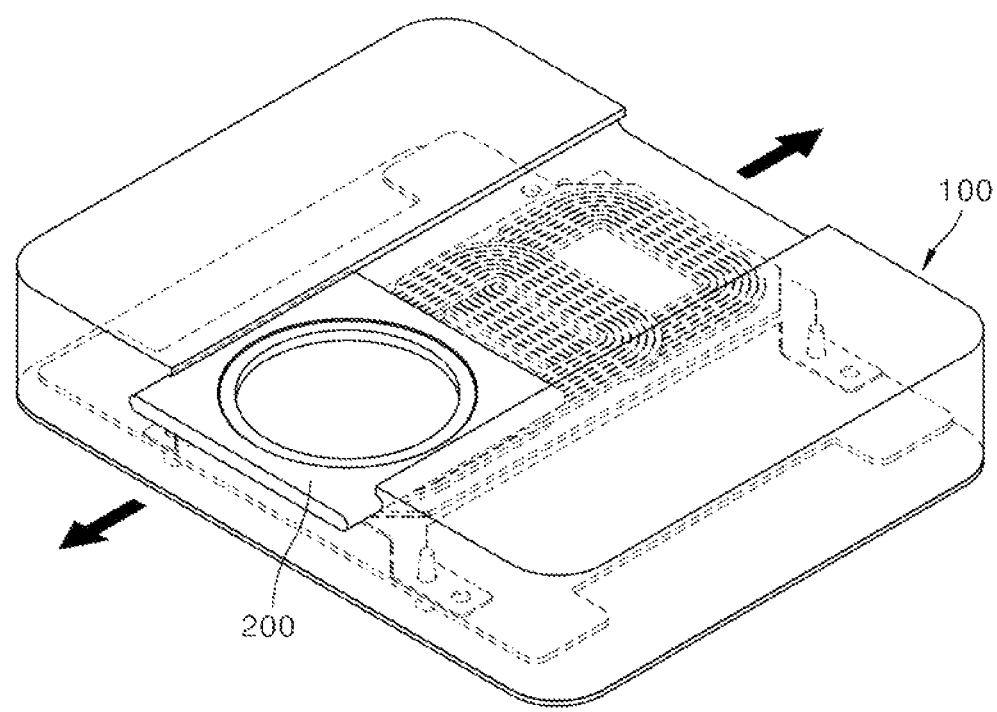

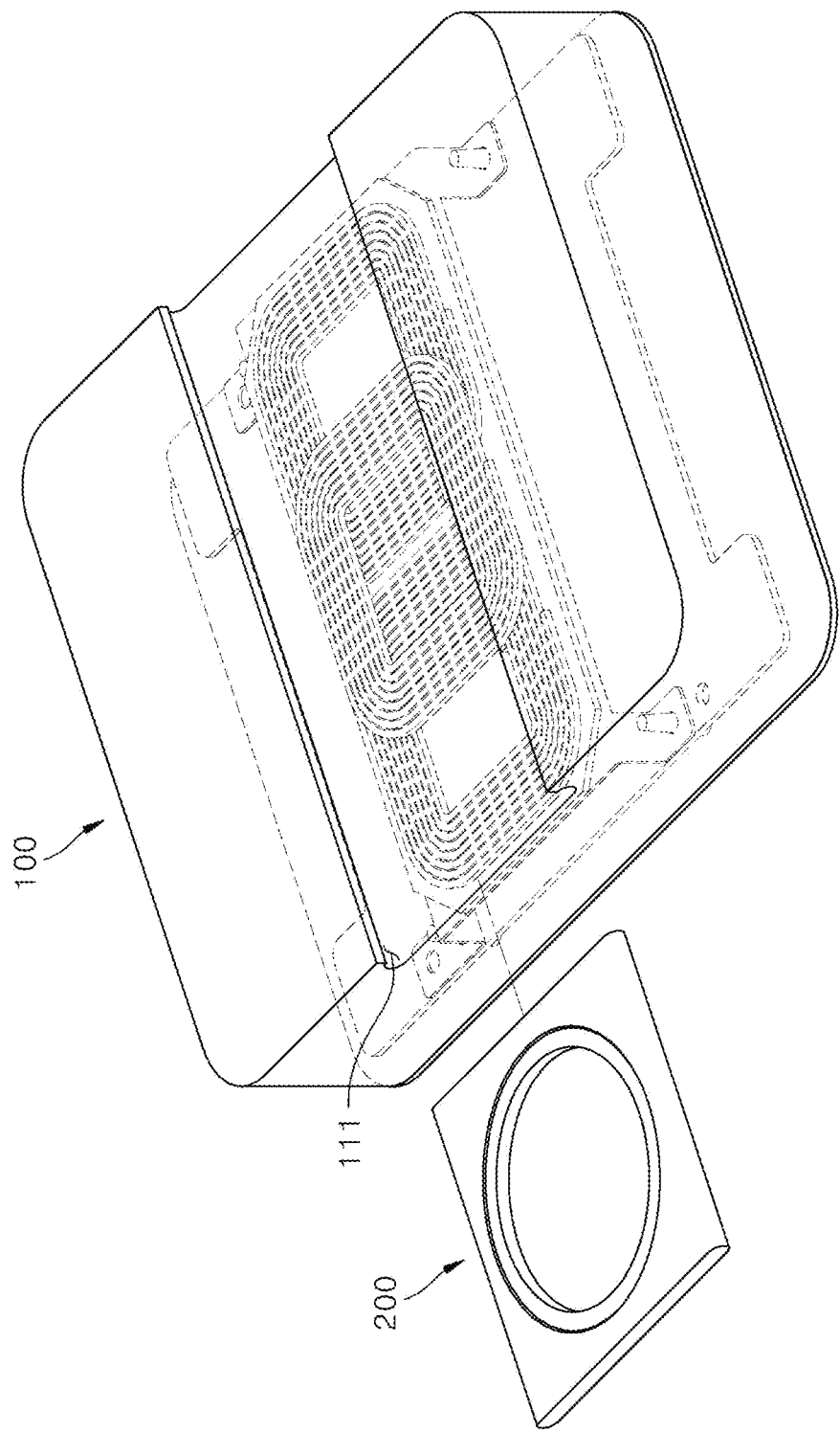
[FIG. 6]

[FIG. 7]
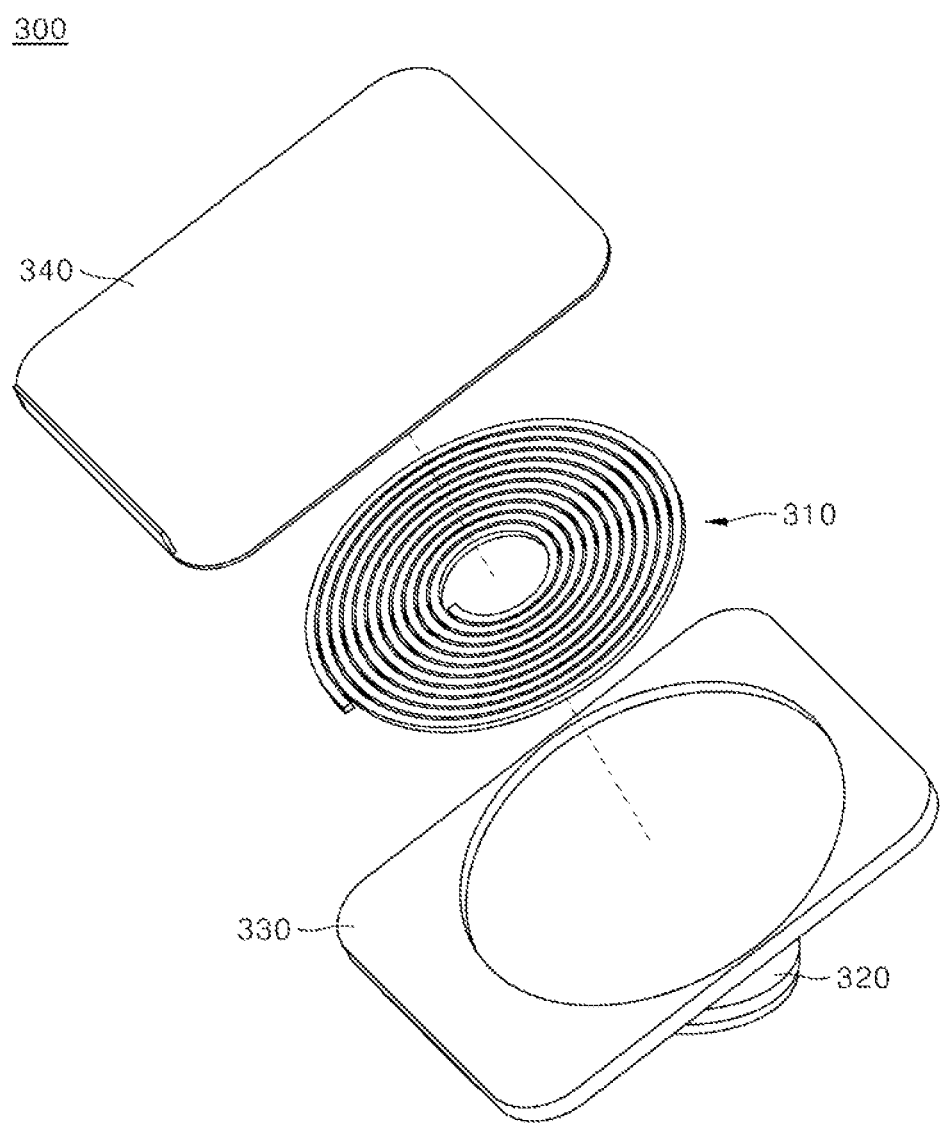

[FIG. 8]
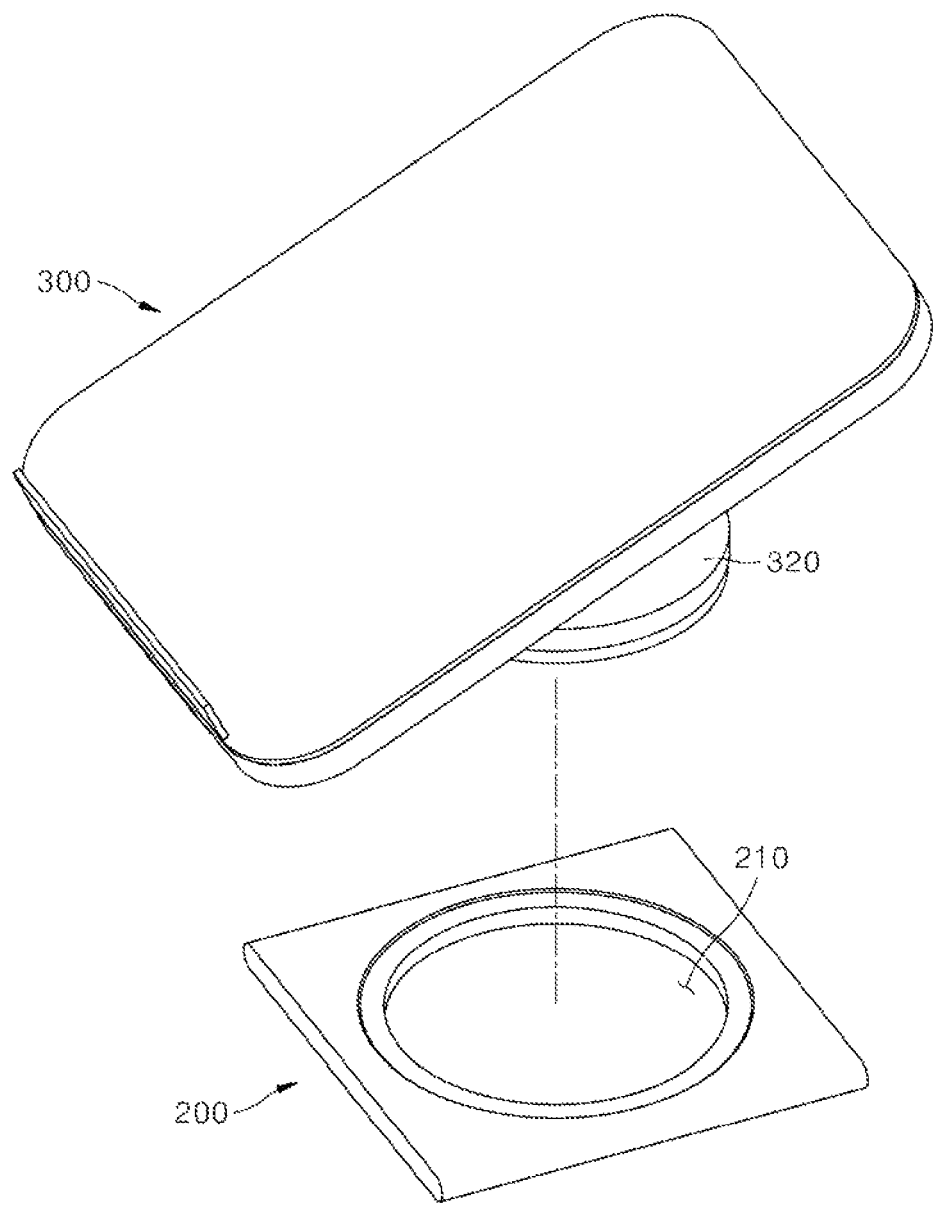

[FIG. 9]
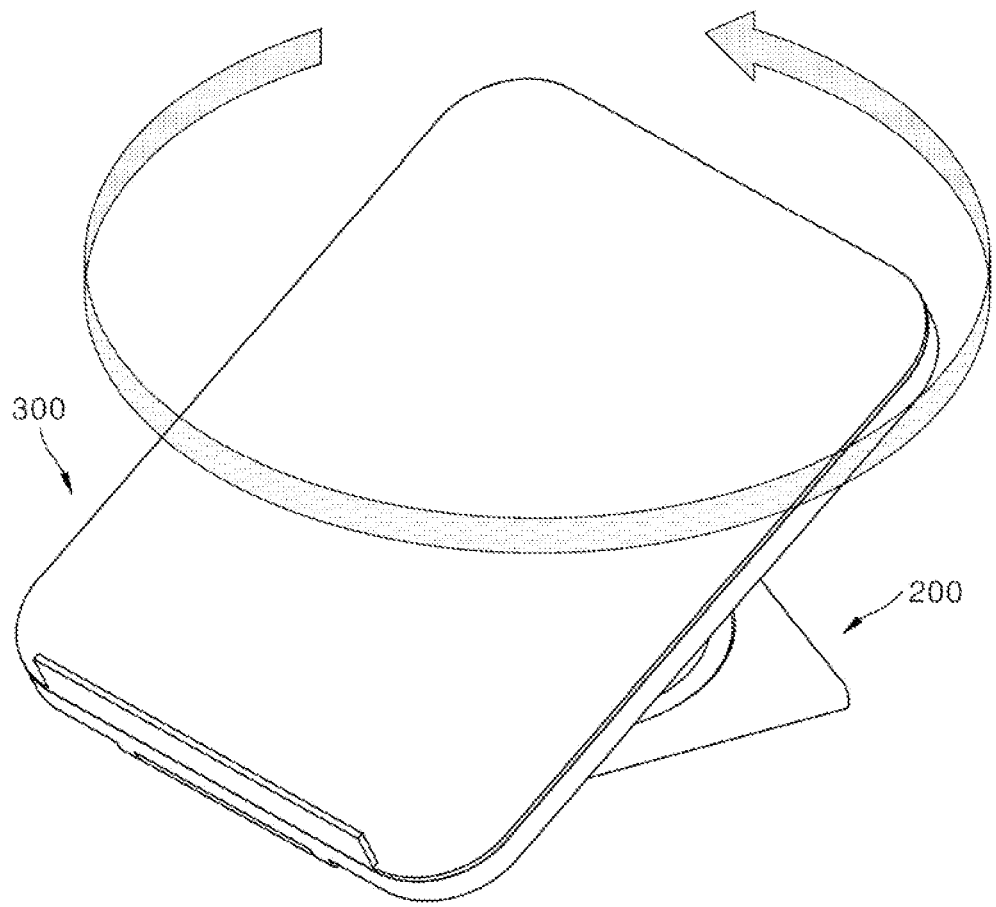

[FIG. 10]
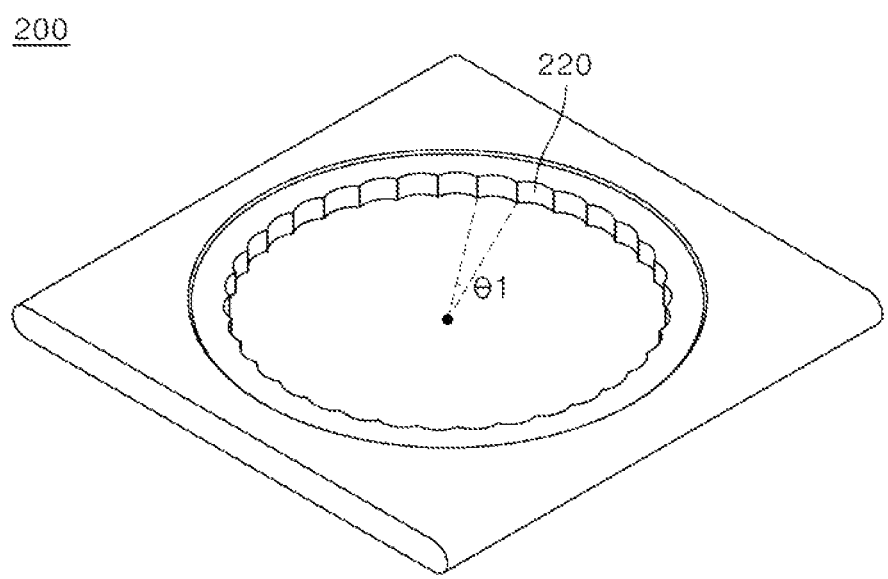

[FIG. 11]
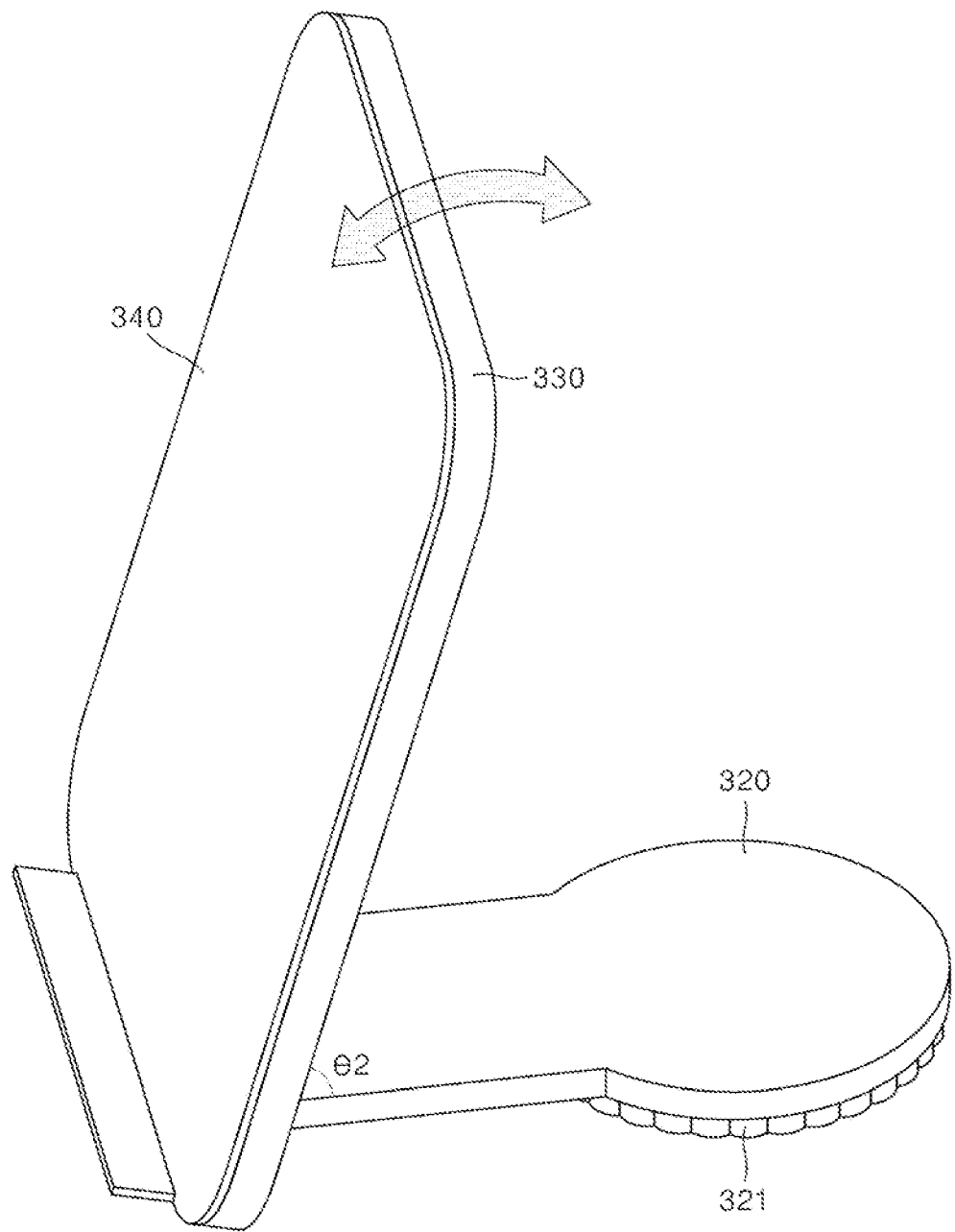

[FIG. 12]
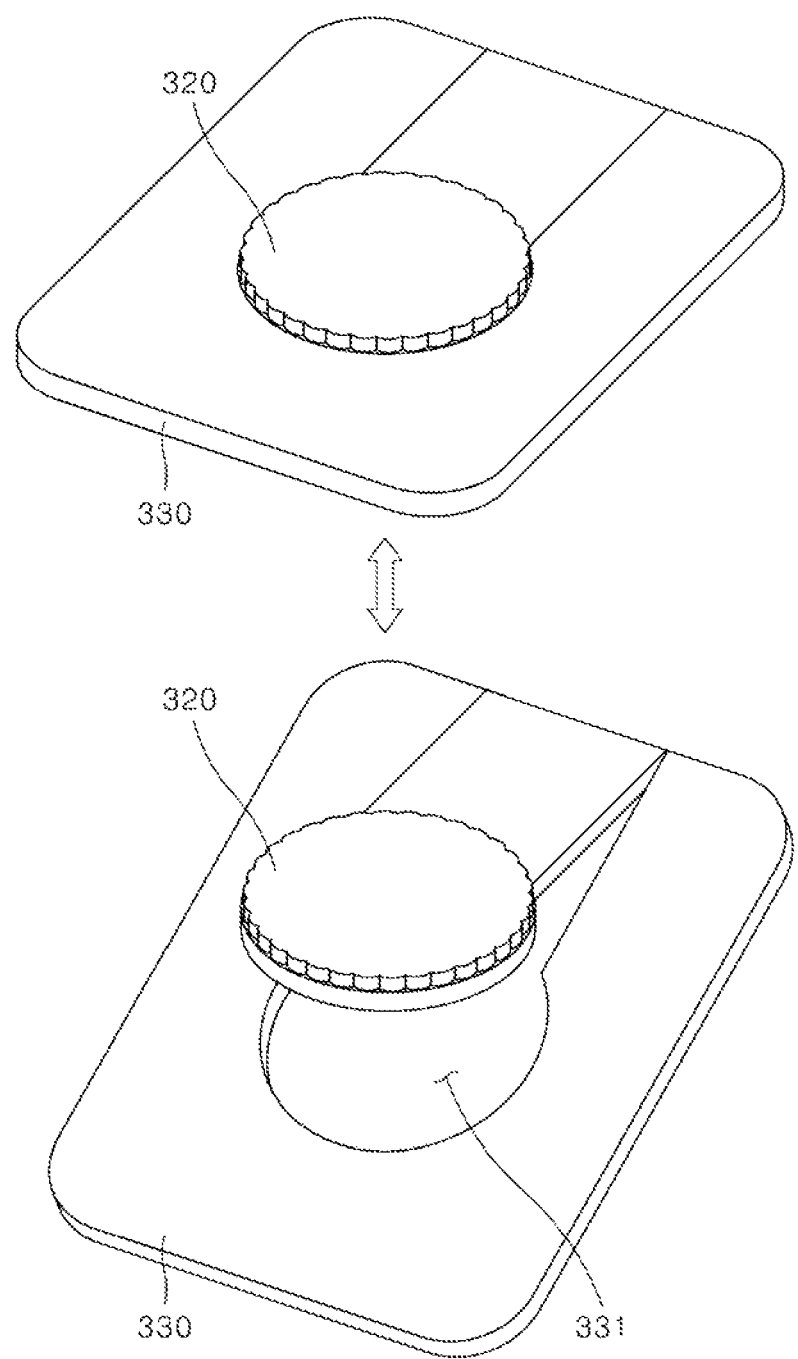

[FIG. 13]
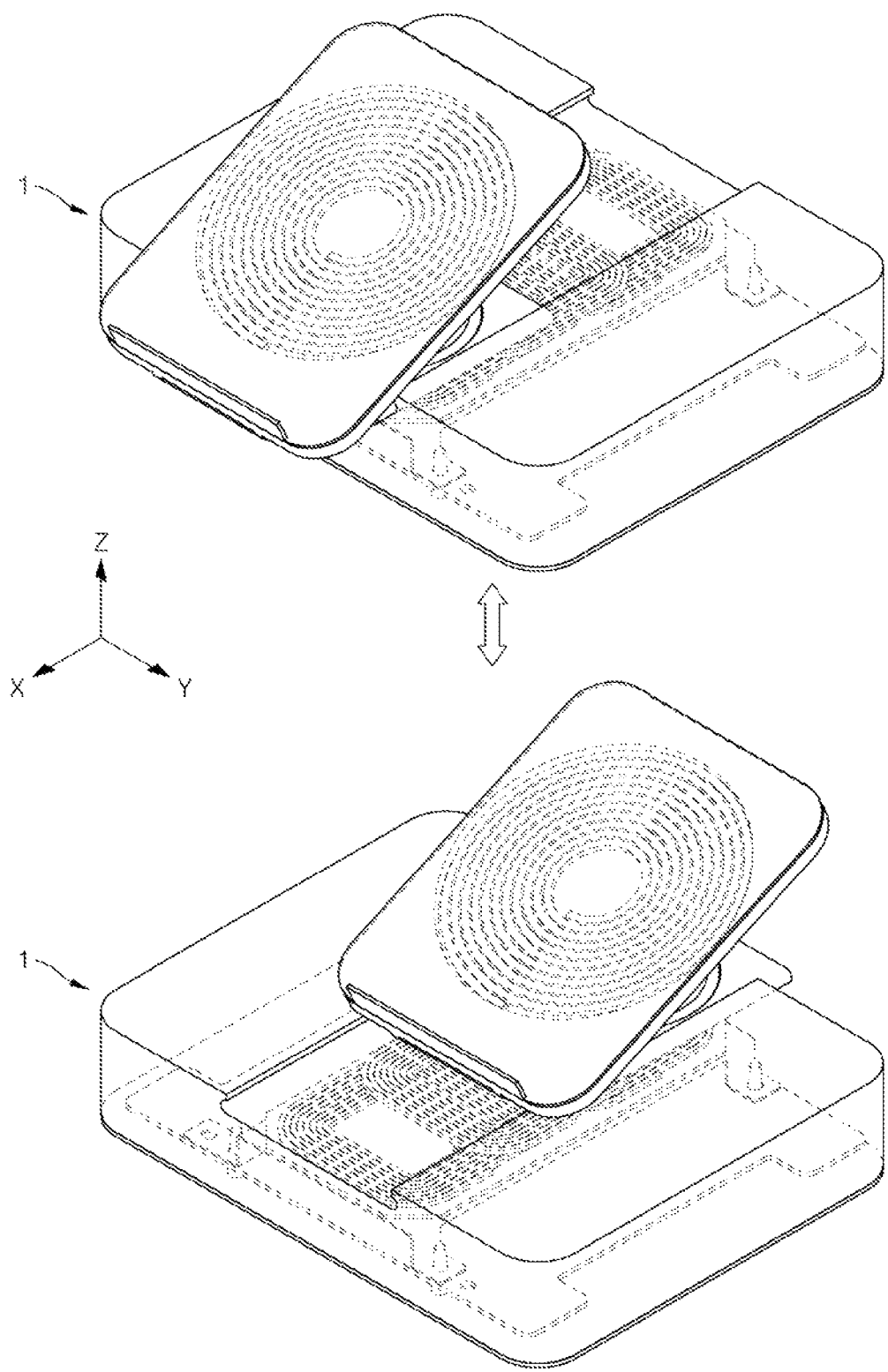

[FIG. 14]
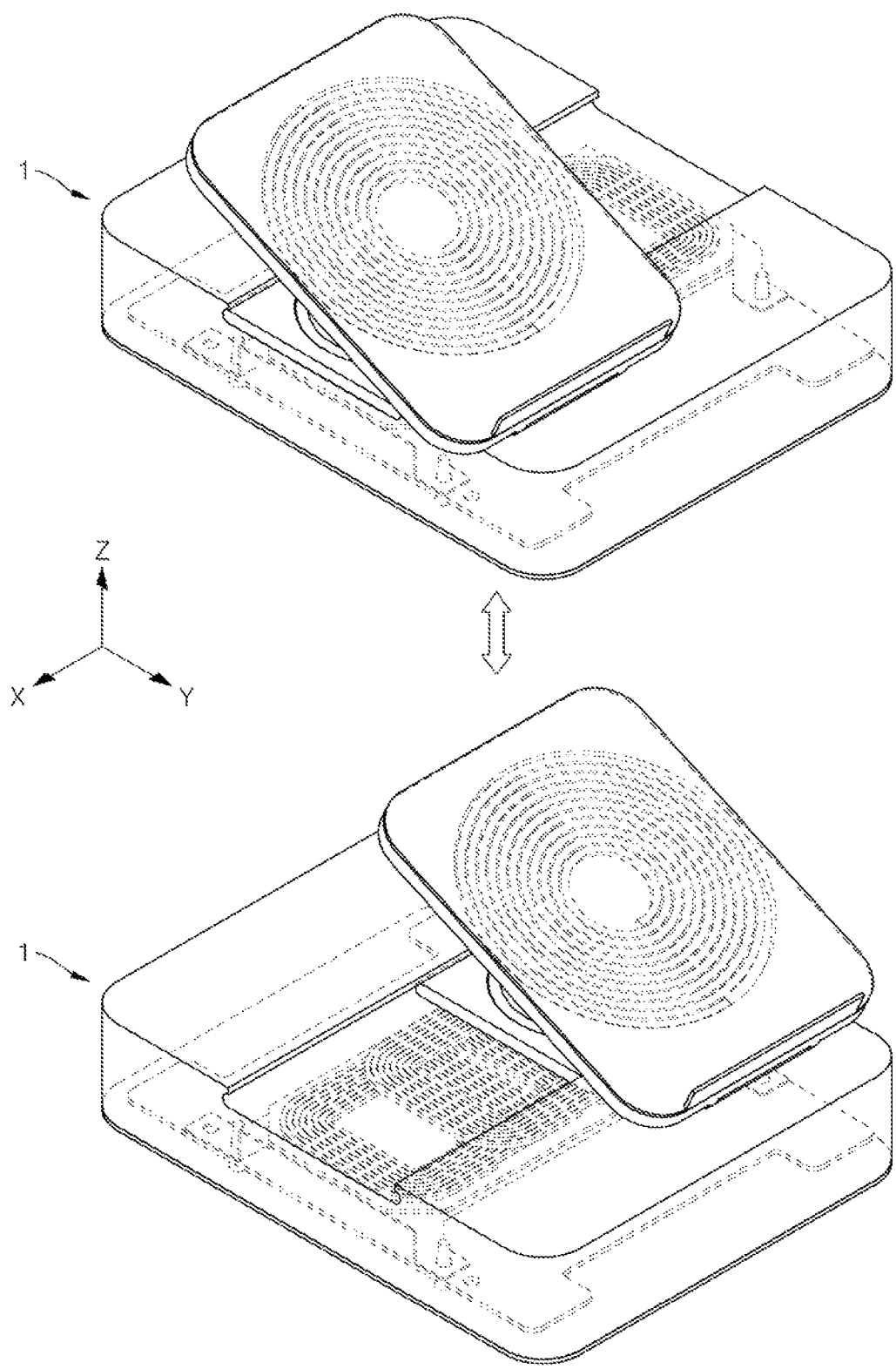

[FIG. 15]
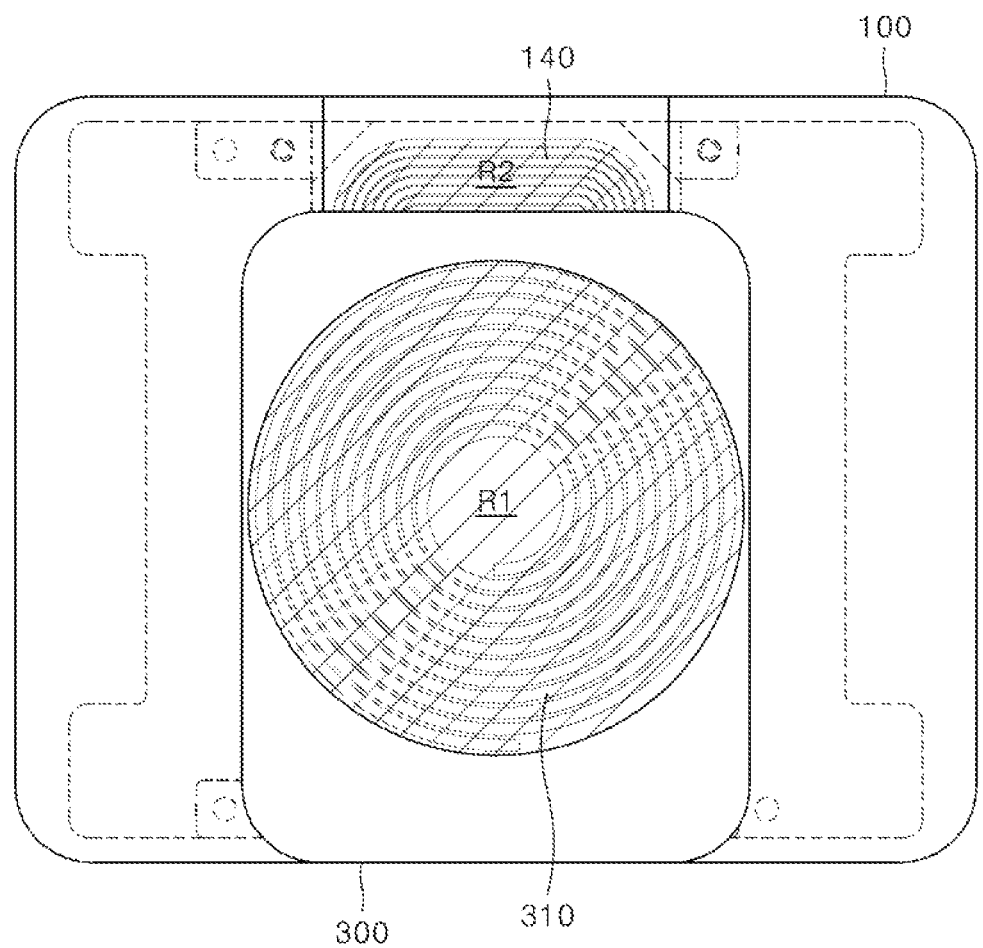

[FIG. 16]
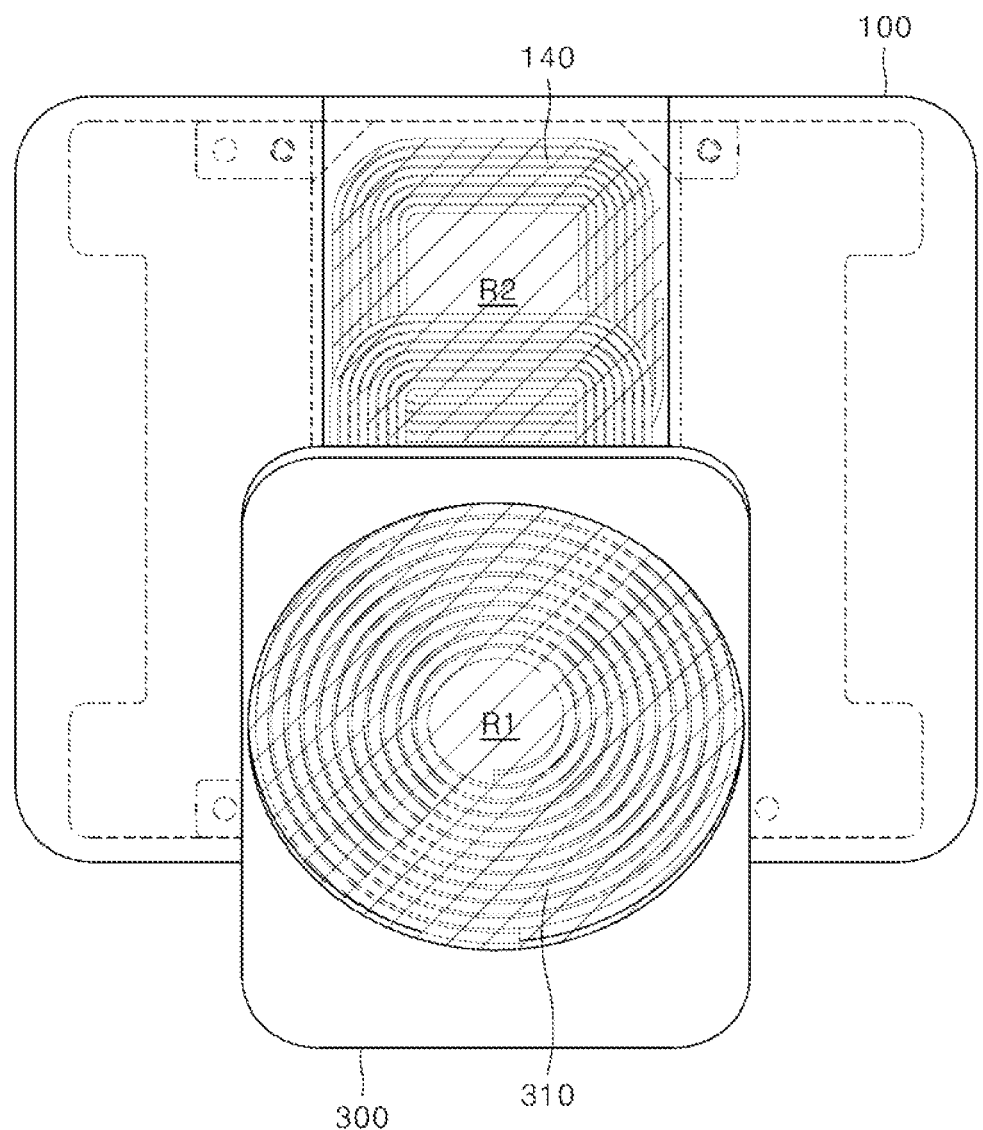

[FIG. 17]
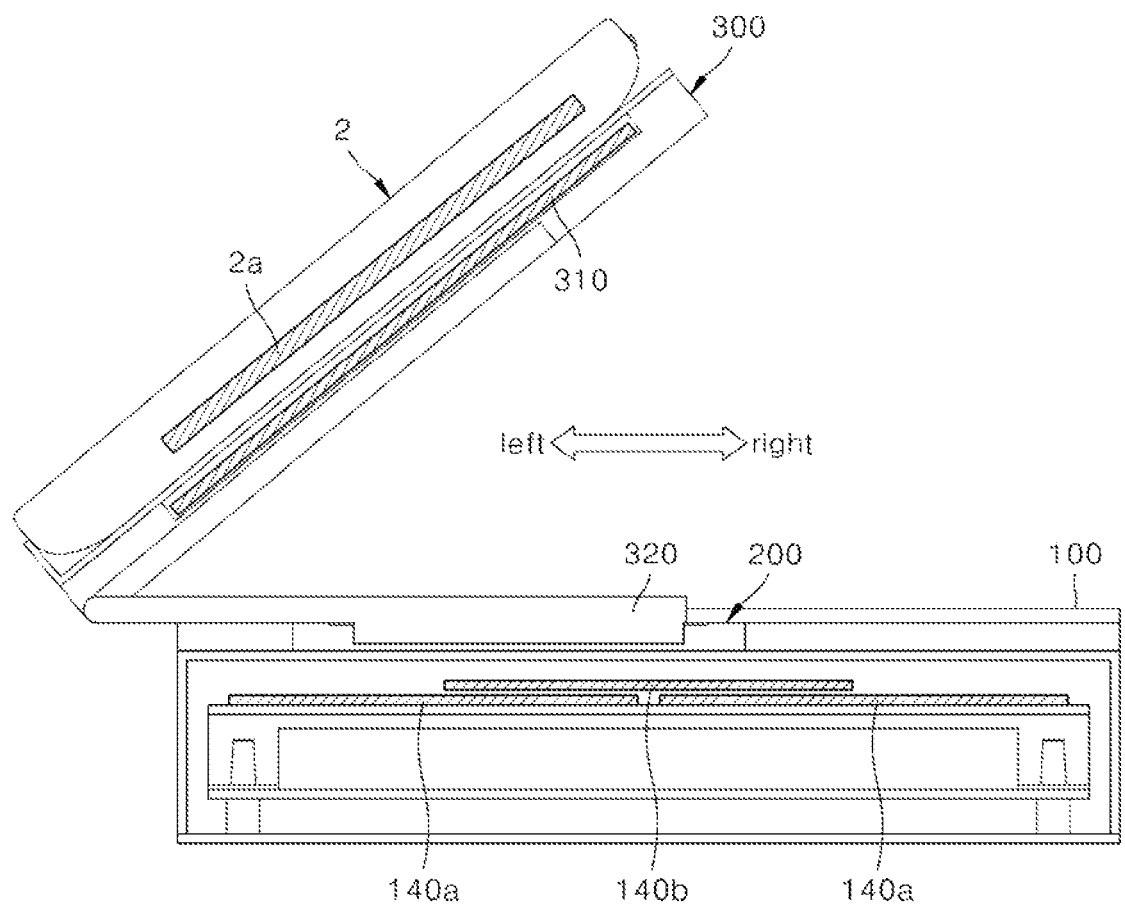

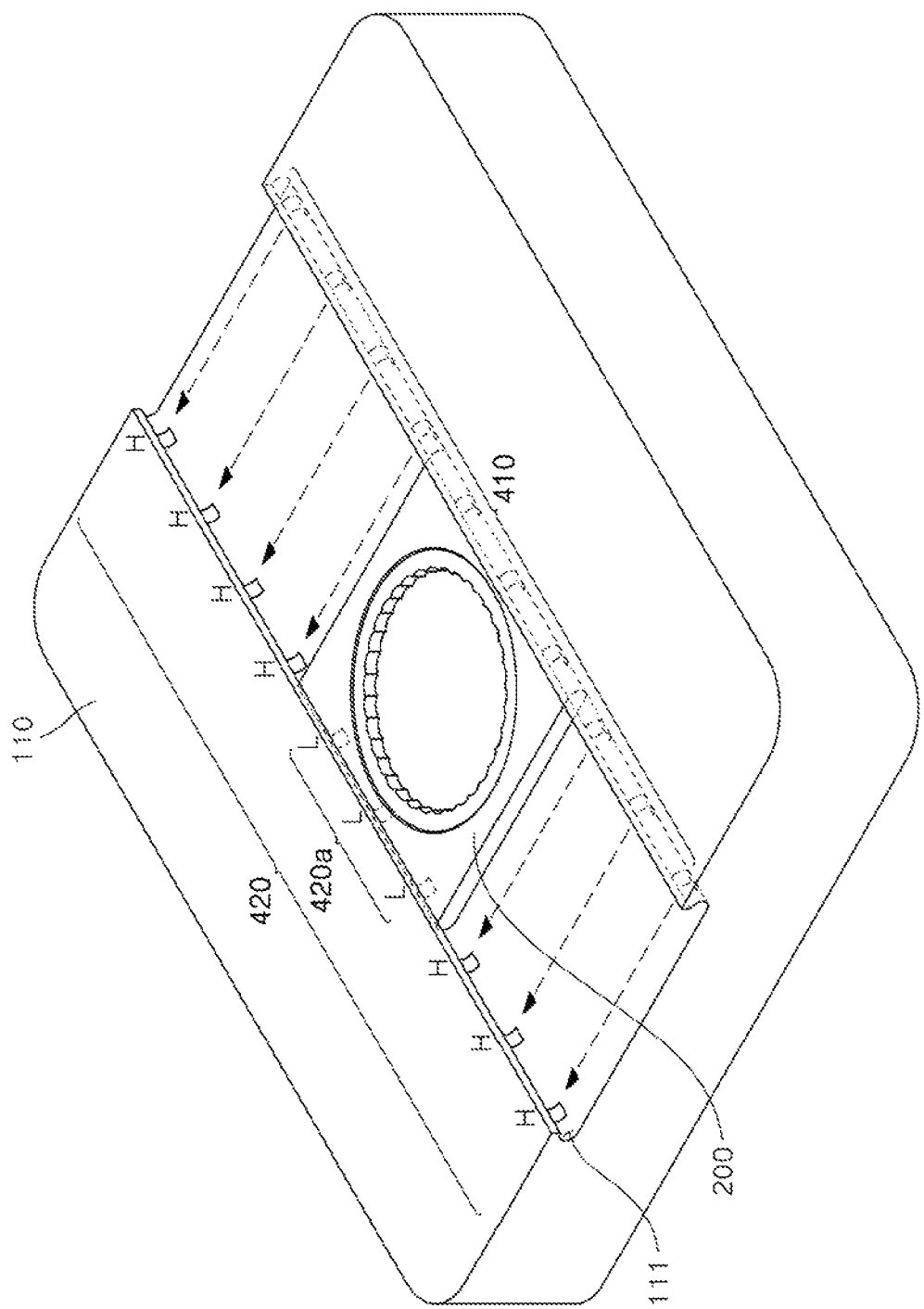
[FIG. 18]

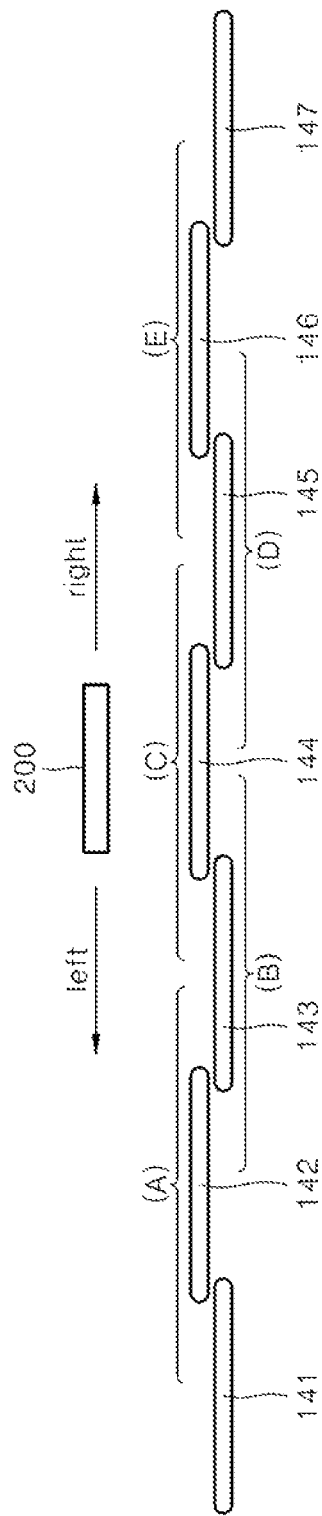

WIRELESS CHARGING APPARATUS THAT CAN SUPPORT USER TERMINAL IN VARIOUS DIRECTIONS AND AT VARIOUS ANGLES

CROSS REFERENCE TO RELATED APPLICATIONS

This Application is the National Stage filing under 35 U.S.C. 371 of International Application No. PCT/KR2019/018737, filed on Dec. 30, 2019, the entire contents of which are hereby expressly incorporated by reference into the present application.

TECHNICAL FIELD

Disclosed herein is a wireless charging device that can change a direction of a magnetic field generated by a transmission coil through a repeater capable of rotating horizontally and vertically, and support a user terminal in parallel with the repeater, to wirelessly transmit power in different directions and at different angles.

BACKGROUND ART

In recent years, technologies for charging a user terminal based on a wireless charging method have been commercialized.

In a process of charging a user terminal based on a wireless charging method, as a user terminal is held by a wireless charging device, a transmission coil in the wireless charging device is magnetically coupled to a reception coil in the user terminal, and the wireless charging device supplies current to the transmission coil.

As current is supplied to the transmission coil, the transmission coil generates a magnetic field, and the magnetic field generated by the transmission coil induces current in the reception coil. The current induced in the reception coil is supplied to a battery in the user terminal, and the user terminal is charged.

In the wireless charging method, to deliver power effectively, a magnetic field, generated by the transmission coil and interlinked with the reception coil, needs to have high intensity, and to this end, the transmission coil and the reception coil need to face each other in parallel.

Accordingly, the user terminal needs to be planarly placed on the wireless charging device all the time. However, in this case, it can be difficult for a user to use the user terminal.

For example, when the user wants to charge the user terminal while watching the screen output from the user terminal, the user must mount the user terminal flat on the top of the wireless charging device. In this case, the output direction of the screen is upward. Accordingly, there is a disadvantage in that it is difficult for the user to view the screen output from the user terminal when the user is located in the front, rear, or side of the wireless charging device.

Accordingly, there is a demand for a wireless charging device that can wirelessly charge a user terminal regardless of the mounting shape of the user terminal.

DESCRIPTION OF INVENTION

Technical Problems

The present disclosure is directed to a wireless charging device in which a user terminal is supported on a repeater that changes a direction of a magnetic field generated by a transmission coil.

The present disclosure is also directed to a wireless charging device that rotates a held user terminal vertically, or rotates and move a held user terminal horizontally.

The present disclosure is also directed to a wireless charging device that prevents a reduction in intensity of a magnetic field which is supplied to a reception coil in a user terminal when the user terminal is held at a slant.

The present disclosure is also directed to a wireless charging device that charges a user terminal through any one transmission coil corresponding to a position of the user terminal without an additional operation for recognizing the user terminal.

The present disclosure is also directed to a wireless charging device that quickly determines an actual position of a user terminal, and charges the user terminal through any one transmission coil corresponding to the position of the user terminal.

Aspects according to the present disclosure are not limited to the above ones, and other aspects and advantages that are not mentioned above can be clearly understood from the following description and can be more clearly understood from the embodiments set forth herein. Additionally, it can be easily understood that the aspects and advantages in the present disclosure are realized via means and combinations thereof described in the appended claims.

Technical Solutions

According to the present disclosure, a repeater is included in a terminal supporting module that is formed at a slant with respect to the upper surface of a case parallel with a transmission coil, thereby making it possible to hold a user terminal on the repeater capable of changing a direction of a magnetic field generated by the transmission coil.

According to the present disclosure, provided is a terminal supporting module that forms a predetermined angle with respect to the upper surface of a power transmitting module, and rotates and moves horizontally with respect to the upper surface of the power transmitting module, thereby making it possible to rotate a held user terminal vertically or rotate and move the held user terminal horizontally.

According to the present disclosure, the repeater is formed and disposed such that a repeater projected area projected onto the upper surface of the power transmitting module can be greater than an area formed by the transmission coil all the time, thereby making it possible to prevent a reduction in intensity of a magnetic field supplied to a reception coil in the user terminal.

According to the present disclosure, any one transmission coil is supplied with voltage selectively based on a position of a moving module that moves along with the user terminal, thereby making it possible to charge the user terminal through any one transmission coil corresponding to a position of the user terminal without an additional operation for recognizing the user terminal.

According to the present disclosure, a position of the user terminal is approximately determined based on a position of the moving module that moves along with the user terminal, and an operation for recognizing the user terminal is performed only through a coil group corresponding to a position of the moving module to identify any one transmission coil capable of transmitting maximum power to the user terminal, thereby making it possible to determine an actual position of the user terminal quickly and charge the user terminal through any one transmission coil corresponding to the actual position of the user terminal.

Advantageous Effects

According to the present disclosure, since a user terminal is supported on a repeater that changes a direction of a magnetic field generated by a transmission coil, the magnetic field can be supplied in a direction of arrangement of a reception coil in the user terminal, regardless of how the user terminal is held, and since the transmission coil and the reception coil are spaced, an amount of heat generated by wireless charging can decrease.

According to the present disclosure, since a held user terminal rotates vertically or rotates and moves horizontally, a user can see the screen of the user terminal in different positions while charging the user terminal wirelessly.

According to the present disclosure, since a reduction in intensity of a magnetic field which is supplied to a reception coil in a user terminal when the user terminal is held at a slant is prevented using the shape and disposition of the repeater, power can be transmitted to the user terminal all the time at maximum efficiency regardless of how the user terminal is held.

According to the present disclosure, since a user terminal is charged through any one transmission coil corresponding to a position of the user terminal without an additional operation for recognizing the user terminal, the user terminal can start to be charged quickly.

According to the present disclosure, since an actual position of a user terminal is rapidly determined and the user terminal is charged through any one transmission coil corresponding to the actual position of the user terminal, the user terminal can start to be charged quickly even if the number of transmission coils increases, and power can be transmitted all the time at maximum efficiency regardless of the position of the user terminal.

Specific effects are described along with the above-described effects in the section of Detailed Description.

BRIEF DESCRIPTION OF DRAWINGS

FIG. 1 is a view showing a user terminal supported by a wireless charging device of one embodiment.

FIG. 2 is a view showing separated components of the wireless charging device in FIG. 1.

FIGS. 3 and 4 are exploded views showing a power transmitting module of each embodiment.

FIGS. 5 and 6 are views for describing a coupling relationship between a moving module and a power transmitting module.

FIG. 7 is an exploded view showing a terminal supporting module of one embodiment.

FIGS. 8 and 9 are views for describing a coupling relationship between a terminal supporting module and a moving module.

FIG. 10 is a view for describing a moving module's structural features for a coupling with a terminal supporting module.

FIG. 11 is a view for describing structural features of a terminal supporting module for a coupling with a moving module and support of a user terminal.

FIG. 12 is a view showing a coupling relationship between a rotating plate and a supporting plate that constitute a terminal supporting module.

FIGS. 13 and 14 are views showing each usage example of the wireless charging device of one embodiment.

FIGS. 15 and 16 are views for describing an area of a repeater, projected onto the upper surface of a case of a power transmitting module, based on an angle of a terminal supporting module.

FIG. 17 is a view for describing a magnetic coupling between a reception coil and each transmission coil, based on a position of a moving module.

FIG. 18 is a view showing an example of a position sensor for sensing a position of a moving module.

FIG. 19 is a view for describing how to determine a position of a user terminal, based on positions of a plurality of grouped transmission coils and a moving module.

DETAILED DESCRIPTION OF EXEMPLARY EMBODIMENTS

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When any one component is described as being in the "upper portion (or lower portion)" of another component or "on (or under)" another component, any one component can be disposed on the upper surface (or lower surface) of another component, and an additional component can be interposed between the two components.

When any one component is described as being "connected", "coupled" or "connected" to another component, any one component can be directly connected or connected to another component, but an additional component can be "interposed" between the two components or the two components can be "connected", "coupled" or "connected" by an additional component.

In the disclosure, the singular forms "a", "an" and "the" are intended to include the plural forms as well, unless explicitly indicated otherwise. It is to be understood that the term "comprise" or "include," when used in this disclosure, is not interpreted as necessarily including stated components or steps, but can be interpreted as excluding some of the stated components or steps or as further including additional components or steps.

Throughout the disclosure, the terms "A and/or B" as used herein can denote A, B or A and B, and the terms "C to D" can denote C or greater and D or less, unless stated to the contrary.

The present disclosure relates to a wireless charging device that can change a direction of a magnetic field generated by a transmission coil through a repeater capable of rotating horizontally and vertically, and support a user terminal in parallel with the repeater, to wirelessly transmit power in different directions and at different angles.

Hereafter, a wireless charging device of one embodiment is described with reference to FIGS. 1 to 19.

FIG. 1 is a view showing a user terminal supported by a wireless charging device of one embodiment, and FIG. 2 is a view showing separated components of the wireless charging device in FIG. 1.

FIGS. 3 and 4 are exploded views showing a power transmitting module of each embodiment.

FIGS. 5 and 6 are views for describing a coupling relationship between a moving module and a power transmitting module.

FIG. 7 is an exploded view showing a terminal supporting module of one embodiment.

FIGS. 8 and 9 are views for describing a coupling relationship between a terminal supporting module and a moving module.

FIG. 10 is a view for describing a moving module's structural features for a coupling with a terminal supporting module, and FIG. 11 is a view for describing structural features of a terminal supporting module for a coupling with a moving module and support of a user terminal.

FIG. 12 is a view showing a coupling relationship between a rotating plate and a supporting plate that constitute a terminal supporting module.

FIGS. 13 and 14 are views showing each usage example of the wireless charging device of one embodiment.

FIGS. 15 and 16 are views for describing an area of a repeater, projected onto the upper surface of a case of a power transmitting module, based on an angle of a terminal supporting module.

FIG. 17 is a view for describing a magnetic coupling between a reception coil and each transmission coil, based on a position of a moving module, and FIG. 18 is a view showing an example of a position sensor for sensing a position of a moving module.

FIG. 19 is a view for describing how to determine a position of a user terminal, based on positions of a plurality of grouped transmission coils and a moving module.

Referring to FIG. 1, the wireless charging device 1 of one embodiment may support a user terminal 2, and transmit power wirelessly to the supported user terminal 2 to charge the user terminal 2.

The wireless charging device 1 may be embodied as a portable device and charge the user terminal 2 in any places. Also, the wireless charging device 1 may be structurally coupled to another device, and charge the user terminal 2. For example, the wireless charging device 1 may be installed in a vehicle, specifically, buried in a dashboard, and when a user places the user terminal 2 on the wireless charging device 1, the wireless charging device 1 may charge the placed user terminal 2.

For the charging operation, the wireless charging device 1 may use electromagnetic induction.

Specifically, when the wireless charging device 1, and the user terminal 2 supported by the wireless charging device 1 are aligned, the wireless charging device 1 may be magnetically coupled to the user terminal 2, and transmit power to the user terminal 2.

To this end, the wireless charging device 1 may include a transmission coil 140 that generates a magnetic field in, therein. In other words, the wireless charging device 1 may transmit power wirelessly to the user terminal 2 through the transmission coil 140 that is included in the wireless charging device 1 and generates a magnetic field.

Hereafter, a theory that the wireless charging device 1 transmits power is specifically described.

As the user terminal 2 is held by the wireless charging device 1, a reception coil 2a in the user terminal 2 and the transmission coil 140 in the wireless charging device 1 may be magnetically coupled. In this case, the wireless charging device 1 may supply voltage to the transmission coil 140, and the transmission coil 140 may generate a magnetic field. The magnetic field generated by the transmission coil 140 may be delivered to the reception coil 2a, and induce current in the reception coil 2a, and the current induced in the reception coil 2a may be supplied to a battery in the user terminal 2 and charge the battery.

Referring to FIG. 2, in the present disclosure, the wireless charging device 1, performing the above-stated wireless charging operation, may consist of a power transmitting module 100, a moving module 200, and a terminal supporting module 300, structurally.

Hereafter, each of the components constituting the wireless charging device 1 is specifically described with reference to the drawings.

A structure of the power transmitting module 100 is described specifically with reference FIGS. 3 and 4.

The power transmitting module 100 may have a plurality of transmission coils 140 that are aligned side by side, therein.

Referring to FIGS. 3 and 4, the power transmitting module 100 of one embodiment may include a case 110, a substrate 120 disposed in the case 110, a planar core 130 disposed on the substrate 120, and a plurality of transmission coils 140 arranged side by side on the planar core 130.

The case 110 may include a top case 110t and a bottom case 110b, and the top case 110t and the bottom case 110b may be coupled to each other and make a space in the case 110 airtight.

A power supply circuit may be mounted onto the substrate 120, and supplies voltage to the transmission coil 140 under the control of a controller that is described below. The power supply circuit may be embodied as a printed circuit board (PCB), an integrated circuit (IC), and the like.

The planar core 130 may be made of a material that has high permeability and is hardly broken. Specifically, the planar core 130 may be made of an amorphous metal such as Co, Fe, Ni, B, Si and the like and a combination thereof, and formed into a sheet or a thin film. For example, in the disclosure, the planar core 130 may be a ferrite core.

Accordingly, the planar core 130 may enhance magnetic flux density of a magnetic field generated by the transmission coil 140, and form a magnetic path of the magnetic field efficiently.

The plurality of transmission coils 140 may be a planar coil that is arranged side by side in one direction on the planar core 130, and have a circular shape, an oval shape or a rectangular shape.

Referring to FIG. 3, in one example, the plurality of transmission coils 140 may be spaced from each other and arranged side by side within an area formed by the planar core 130. In this case, the plurality of transmission coils 140 may be arranged side by side at regular intervals. Specifically, the plurality of transmission coils 140 may be arranged side by side in a way that a distance d1 between the centers of a transmission coil 140 and a transmission coil 140 is the same.

In another example, the plurality of transmission coils 140 may include a plurality of first coils 140a that are disposed on the same horizontal surface and spaced from each other, and at least one second coil 140b that is disposed on the plurality of first coils 140a and partially overlaps the plurality of first coils 140a.

Referring to FIG. 4, two first coils 140a may be disposed on the planar core 130 at the same height and spaced from each other, and a single second coil 140b may be disposed on the first coils 140a spaced from each other and partially overlap each of the first coils 140a. In this case, the first coils 140a and the second coil 140b may be respectively arranged at regular intervals side by side. In other words, the first coils 140a and the second coil 140b may be arranged side by side in a way that a distance d2 between the centers of the first coils 140a and the center of the second coil 140b is the same.

The number of the first coils 140a and the number of the second coils 140b are not limited. Hereafter, suppose that the transmission coil 140 includes two first coils 140a and a single second coil 140b, as illustrated in FIG. 4, for convenience of description.

Each transmission coil 140 may have a terminal for an electric connection with the above-described power supply circuit, at both ends thereof. The power supply circuit may supply voltage to each terminal of the transmission coil 140, under the control of the controller.

For example, when the user terminal 2 is supported by the wireless charging device 1 as illustrated in FIG. 1, the power supply circuit may supply voltage to any one of the plurality of transmission coils 140, under the control of the controller. Accordingly, the transmission coil 140 may generate a magnetic field, and the magnetic field generated by the transmission coil 140 may induce current in the reception coil 2a in the user terminal 2. The current induced in the reception coil 2a may charge a battery inside the user terminal 2.

The method in which the controller controls the power supply circuit is specifically described below.

Hereafter, the function and structure of the moving module 200 are described specifically, with reference to FIGS. 5 and 6.

The moving module 200 may be coupled to the above-described power transmitting module 100, and move the below-described terminal supporting module 300 in a direction in which the transmission coils 140 are arranged. As illustrated in FIGS. 3 and 4, the plurality of transmission coils 140 may be arranged side by side in one direction. In this case, the moving module 200 coupled to the terminal supporting module 300 may move the terminal supporting module 300 along the direction in which that the transmission coils 140 are arranged (hereafter, an arrangement direction), by moving on the power transmitting module 100.

Accordingly, the position of the terminal supporting module 300 may be always on the line where the transmission coils are arranged, regardless of how far and in which direction the moving module 200 moves. In other words, the terminal supporting module 300 may be always on any transmission coil 140.

To move the terminal supporting module 300 along the arrangement direction of the transmission coils 140, the moving module 200 may be disposed on the upper surface of the power transmitting module 100, specifically, on the upper surface of the case 110 of the power transmitting module 100, and slide along the arrangement direction of the transmission coils 140.

Referring to FIG. 5, the moving module 200 may be movably coupled to the upper surface of the case 110, and in the state of being coupled to the case 110, may slide along the arrangement direction of the transmission coils 140. Specifically, the moving module 200 may be coupled to the upper surface of the case 110 in a way that the moving module 200 can slide on a straight line where the transmission coils 140 are arranged.

To this end, the moving module 200 and the upper surface of the case 110 may be coupled through various fastening structures. For example, a rail may be fixedly installed on the upper surface of the case 110 along the arrangement direction of the transmission coils 140, and the moving module 200 may be coupled to the rail and slide along a direction in which the rail extends. Additionally, a groove may be formed on the upper surface of the case 110 along the arrangement direction of the transmission coils 140, and the moving module 200 may be coupled to the groove and slide.

Referring to FIG. 6, a sliding groove 111 may be formed on the upper surface of the power transmitting module 100, specifically, the upper surface of the case 110, and extend along the arrangement direction of the transmission coils 140 on the straight line where the transmission coils 140 are arranged. The sliding groove 111 may be formed in a way that the sliding groove 111 is depressed from the upper surface of the case 110, and integrated with the upper surface of the case 110.

In this case, the moving module 200 may be coupled to the sliding groove 111 and slide along the arrangement direction of the transmission coils 140. Specifically, the moving module 200 may have a flat plate shape, and both lateral ends of the moving module 200 may be formed to correspond to the curved shape of the sliding groove 111.

As both the lateral ends of the moving module 200 are fitted to the sliding groove 111, the moving module 200 may be coupled to the sliding groove 111, and slide along the sliding groove 111 that extends along the arrangement direction of the transmission coils 140.

Hereafter, the function of the terminal supporting module 300 is specifically described.

The terminal supporting module 300 may be disposed on the upper surface of the case 110 of the power transmitting module 100, and in a state of inclining with respect to the upper surface of the case 110, support the user terminal 2.

To improve power transmission efficiency, a magnetic field generated by the transmission coil 140 and interlinked with the reception coil 2a needs to have high intensity. To this end, the transmission coil 140 and the reception coil 2a need to be disposed to face each other in parallel.

However, when the terminal supporting module 300 is disposed at a slant with respect to the upper surface of the case 110, and the user terminal 2 is supported by the terminal supporting module 300 in parallel with the terminal supporting module 300, as illustrated in FIG. 1, the transmission coil 140 in the power transmitting module 100 and the reception coil 2a in the user terminal 2 may not be disposed in a way that they face each other in parallel. In this case, intensity of a magnetic field generated by the transmission coil 140 and interlinked with the reception coil 2a may decrease, thereby deteriorating power transmission efficiency.

To prevent this from happening, the terminal supporting module 300 may have a repeater 310, therein, and the repeater 310 may change a direction of the magnetic field generated by the transmission coil 140 to a direction toward the reception coil 2a. Specifically, the terminal supporting module 300 may be provided therein with the repeater 310 that is disposed to face the reception coil 2a in the user terminal 2 in parallel with the reception coil 2a when the user terminal 2 is supported by the terminal supporting module 300.

A magnetic field generated upward by the transmission coil 140 may interlink with the repeater 310, and accordingly, current may be induced in the repeater 310. The current induced in the repeater 310 may generate a magnetic field that is perpendicular to the repeater 310. As the magnetic field generated upward by the transmission coil 140 passes through the repeater 310 through the process, the direction of the magnetic field may change to a direction (a direction toward the reception coil 2a) perpendicular to the repeater 310.

In this case, since the repeater 310 and the reception coil 2a are disposed to face each other, large amounts of magnetic fields may interlink with the reception coil 2a, thereby preventing deterioration in power transmission efficiency.

In the disclosure, since the user terminal 2 is held on the repeater 310 that changes the direction of a magnetic field generated by the transmission coil 140 as described above, a magnetic field may be provided in a direction where the reception coil 2a in the user terminal 2 is disposed, regardless of how the user terminal 2 is held, and since the transmission coil 140 is spaced from the reception coil 2a, an amount of heat generated by wireless charging may decrease.

Hereafter, the structure of the terminal supporting module 300, and a connection relationship between the terminal supporting module 300 and the moving module 200 are specifically described with reference to FIGS. 7 to 12.

Referring to FIG. 7, the terminal supporting module 300 may include a rotating plate 320 that is coupled to the moving module 200, a supporting plate 330 that is coupled to the rotating plate 320, and a terminal supporting case 340 that directly contacts the user terminal 2 as the outer surface of the terminal supporting module 300, in addition to the repeater 310.

The terminal supporting module 300, configured as described above, may be coupled to the moving module 200 in a way that the terminal supporting module 300 can rotate horizontally. Specifically, the rotating plate 320 of the terminal supporting module 300 may be coupled to the moving module 200, and rotate horizontally on the fixed moving module 200.

Referring to FIG. 8, for the terminal supporting module 300 to be rotatably coupled to the moving module 200, a circular depression 210 may be formed on the upper surface of the moving module 200, and the terminal supporting module 300 may be inserted into the depression 210. Specifically, the depression 210 may be formed into a circle that is depressed downward, and the rotating plate 320 of the terminal supporting module 300 may have a circular plate shape corresponding to the shape of the depression 210, and be inserted into the depression 210.

The rotating plate 320 of the terminal supporting module 300 may be inserted into the depression 210 and rotate.

Referring to FIG. 9, the rotating plate 320 may rotate circumferentially and horizontally in the state of being inserted into the depression 210. Accordingly, the repeater 310, the supporting plate 330 and the terminal supporting case 340 that are coupled to the rotating plate 320 may also rotate circumferentially as the rotating plate 320 rotates.

As the terminal supporting module 300 and the moving module 200 are coupled as described above, a plurality of rotate grooves 220 may be arranged circumferentially side by side on the inner circumferential surface of the depression 210 formed at the moving module 200. In this case, the terminal supporting module 300 may be coupled to the plurality of rotate grooves 220 and rotate horizontally by a unit angle.

Referring to FIG. 10, the plurality of rotate grooves 220 may be arranged side by side at regular intervals, on the inner circumferential surface of the depression 210. Accordingly, a central angle θ1 of each rotate groove 220 may be the same angle as a unit angle.

As the rotating plate 320 is inserted into the depression 210, the rotating plate 320 may be coupled to the plurality of rotate grooves 220 provided on the inner circumferential surface of the depression 210. For example, the rotating plate 320 may have a circular plate shape, and may be coupled to the plurality of rotate grooves 220 provided on the inner circumferential surface of the depression 210 through any coupling member that is provided on the outer circumferential surface of the rotating plate 320.

The rotating plate 320 coupled to the plurality of rotate grooves 220 may be fixed by an elastic force of the coupling member coupled to each rotate groove 220. However, as an external force (e.g., a rotation force applied by a user) is applied, the rotating plate 320 may rotate by the central angle (a unit angle) formed by each rotate groove 220. For example, a coupling member coupled to a first rotate groove is fixed by its elastic force, but as the user rotates the rotating plate 320, the coupling member may rotate by a unit angle and be fixed and coupled to a second rotate groove adjacent to the first rotate groove.

Referring to FIG. 11, the rotating plate 320 may include a plurality of rotate projections 321 as a coupling member, and each of the plurality of rotate projections 321 may be coupled to each of the plurality of rotate grooves 220. Specifically, the circular rotating plate 320 may include the plurality of rotate projections 321 formed on the outer circumferential surface of the rotating plate 320.

In this case, the plurality of rotate projections 321 formed on the rotating plate 320 may be respectively coupled to the plurality of rotate grooves 220 formed at the depression 210 of the moving module 200. To this end, a central angle of each rotate projection 321 may be the same angle as a unit angle.

The rotate projection 321 may be made of an elastic material. As the rotating plate 320 is fitted into the depression 210, each rotate projection 321 may be completely coupled and fixed to each rotate groove 220. In this case, as the user applies a rotation force to the rotating plate 320, each of the plurality of rotate projections 321 may be consecutively coupled to each of the plurality of rotate grooves 220 while rotating by a unit angle.

When the user rotates the terminal supporting module 300 using the above structure, a clicking sensation felt by the user may help to improve sense of use.

The supporting plate 330 may be coupled to the rotating plate 320 in a way that the supporting plate 330 can rotate vertically with respect to the rotating plate 320.

As described above, the moving module 200 may be disposed in parallel with the power transmitting module 100, and the rotating plate 320 may also be coupled to the moving module 200 in parallel with the moving module 200. In this state, for the terminal supporting module 300 to be disposed at a slant with respect to the upper surface of the case 110, the supporting plate 330 coupled to the rotating plate 320 may rotate vertically with respect to the rotating plate 320, as illustrated in FIG. 11.

Specifically, one lateral end of the supporting plate 330 may be fastened to the rotating plate 320 through a hinge shaft. Accordingly, the supporting plate 330 may rotate vertically with respect to the rotating plate 320 fixed to the moving module 200.

Since the rotating plate 320 is disposed in parallel with the upper surface of the case 110, an angle θ2 formed by the rotating plate 320 and the supporting plate 330 may be the same as an angle that is formed by the user terminal 2 held by the terminal supporting module 300 with respect to the upper surface of the power transmitting module 100.

The supporting plate 330 may form an angle within a certain range with respect to the rotating plate 320. In other words, the supporting plate 330 may rotate vertically with respect to the rotating plate 320 within a maximum angle. To this end, any member for limiting an angle may be added in different ways to the hinge shaft connecting the supporting plate 330 and the rotating plate 320.

Limiting the maximum angle may help to ensure high power transmission efficiency when power is transmitted through the repeater 310. Description in relation to this is provided below with reference to FIGS. 15 and 16.

Referring to FIG. 12, the rotating plate 320 may be inserted into a storage groove 331 that is depressed from the rear surface of the supporting plate 330. Specifically, the terminal supporting case 340 may be coupled to the front surface of the supporting plate 330, and the storage groove 331 having a shape corresponding to the shape of the rotating plate 320 may be depressed from the rear surface of the supporting plate 330.

When the supporting plate 330 rotates with respect to the rotating plate 320 and an angle θ2 between the supporting plate 330 and the rotating plate 320 becomes 0, the rotating plate 320 may be inserted into the storage groove 331 formed on the rear surface of the supporting plate 330. When the rotating plate 320 is inserted into the storage groove 331, the supporting plate 330 may be disposed in parallel with the case 110.

That is, according to the present disclosure, the user terminal 2 may be held at a slant as described above, and may be held planarly as in a wireless charging device 1 of the related art.

Referring to FIG. 13, in one usage example, the terminal supporting module 300 may have a height-wise (a z-axis direction) slant with respect to the arrangement direction (an x-axis direction) of the transmission coils 140. In this state, the terminal supporting module 300 may move through the moving module 200 in a front-rear direction along the arrangement direction (the x-axis direction) of the transmission coils 140.

Accordingly, the user located in the front (in a +x-axis direction) of the terminal supporting module 300 may secure a view of the screen of output from the user terminal 2, and in this case, the user terminal 2 may be supplied with power from any one of the plurality of transmission coils 140 and be charged based on the position (the x-axis position) of the terminal supporting module 300.

Referring to FIG. 14, in another usage example, the terminal supporting module 300 may have a height-wise (the z-axis direction) slant with respect to a direction (a y-axis direction) horizontally perpendicular to the arrangement direction of the transmission coils 140. In this state, the terminal supporting module 300 may move through the moving module 200 in the front-rear direction along the arrangement direction (the x-axis direction) of the transmission coils 140.

Accordingly, the user in a lateral direction (a +y-axis direction) of the terminal supporting module 300 (in a +x-axis direction) may secure a view of the screen of output from the user terminal 2, and in this case, the user terminal 2 may be supplied with power from any one of the plurality of transmission coils 140 and be charged based on the position (the x-axis position) of the terminal supporting module 300.

The controller's supply of voltage to any one of the plurality of transmission coils 140 based on the position of the terminal supporting module 300 is described below.

As discussed above, by rotating vertically or rotating and moving horizontally the hold user terminal 2 as described above, the user can check the screen output from the user terminal 2 in various positions while the user terminal 2 is being wirelessly charged.

The repeater 310, as described above, may deliver a magnetic field, generated by the transmission coil 140, to the reception coil 2a. In this case, to increase intensity of the magnetic field supplied to the reception coil 2a, a magnetic field generated by the transmission coil 140 and interlinked with the repeater 310 needs to have high intensity.

To increase intensity of the magnetic field interlinked with the repeater 310, a repeater projected area R1 formed on the upper surface of the power transmitting module 100 may be greater than an area R2 formed by each transmission coil 140, when the repeater 310 is projected onto the upper surface of the power transmitting module 100.

Referring to FIG. 15, when an angle formed by the supporting plate 330 and the rotating plate 320 is 0, i.e., when the terminal supporting module 300 is disposed in parallel with the case 110 of the power transmitting module 100, the repeater projected area R1 may be the same as the area where the repeater 310 is actually disposed, and have a maximum surface area. In this case, the repeater projected area R1 may be greater than the area R2 formed by any of the plurality of transmission coils 140.

Referring to FIG. 16, when an angle formed by the supporting plate 330 and the rotating plate 320 is a maximum angle, i.e., when the terminal supporting module 300 forms a maximum angle with respect to the upper surface of the case 110 of the power transmitting module 100, the repeater projected area R1 may have a minimum surface area. In this case, the repeater projected area R1 may be greater than the area R2 formed by any of the plurality of transmission coils 140.

That is, the repeater projected area R1 may always be greater than the area R2 formed by the transmission coil 140 regardless of an angle that is formed by the terminal supporting module 300 with respect to the upper surface of the power transmitting module 100. Accordingly, most of the magnetic fields generated by any transmission coil 140 may interlink with the repeater 310, and the repeater 310 may deliver power to the reception coil 2a at high efficiency.

According to the present disclosure, a decrease in intensity of a magnetic field that is supplied to the reception coil 2a in the user terminal 2 when the user terminal 2 is held at a slant may be prevented using the shape and disposition of the repeater 310, as described above. Thus, regardless of how the user terminal 2 is held, power can be transmitted to the user terminal 2 all the time at high efficiency.

The controller's transmission of power to the user terminal 2 as a result of supply of voltage to the transmission coil 140 is described hereafter with reference to FIGS. 17 to 19.

The controller may supply voltage to any one of the plurality of transmission coils 140 based on a position of the moving module 200. Specifically, the controller may supply a control signal to the power supply circuit on the substrate 120 based on a position of the moving module 200, and the power supply circuit, may supply voltage to any one transmission coil 140 based on the control signal. To this end, the controller may be provided on the above-described substrate 120 along with the power supply circuit, or may be provided outside the power transmitting module 100 and electrically connect to the power supply circuit.

To perform the above-mentioned function, the controller may be embodied as a physical component including at least one of ASICs (application specific integrated circuits), DSPs (digital signal processors), DSPDs (digital signal processing devices), PLDs (programmable logic devices), FPGAs (field programmable gate arrays), controllers, micro-controllers, processors, and microprocessors, or a combination thereof.

The user terminal 2 may be supplied with power from any one of the plurality of transmission coils 140 included in the power transmitting module 100. In this case, to maximize power transmission efficiency, the reception coil 2a in the user terminal 2 needs to be magnetically coupled to any one of the plurality of transmission coils 140 in the power transmitting module 100, which can make the strongest magnetic coupling with the reception coil 2a.

As intensity of a magnetic field generated by the transmission coil 140 and interlinked with the reception coil 2a increases, intensity of a magnetic coupling between the transmission coil 140 and the reception coil 2a increases. Intensity of the magnetic field interlinked with the reception coil 2a may be determined based on a position relationship between the reception coil 2a and the transmission coil 140.

However, as discussed above, a magnetic field may be supplied to the reception coil 2a through the repeater 310. As the user terminal 2 is held on the terminal mounting module 300, the position relationship between the reception coil 2a and the repeater 310 is fixed. Therefore, the intensity of the magnetic field interlinked with the reception coil 2a may be determined according to the position relationship between the repeater 310 and the transmitting coil 140.

Referring to FIG. 17, when the user terminal 2 is supported by the terminal supporting module 300, a relative position between the reception coil 2a and the repeater 310 may be fixed. In this case, as the moving module 200 moves to the left, a magnetic field generated by a first left coil 140a, among the plurality of transmission coils 140, may mostly interlink with the repeater 310.

Additionally, as the moving module 200 moves to the right, a magnetic field generated by a second coil 140b, among the plurality of transmission coils 140, may mostly interlink with the repeater 310, and as the moving module 200 moves further to the right, a magnetic field generated by a first right coil 140a, among the plurality of transmission coils 140, may mostly interlink with the repeater 310.

Considering the positioning features, the controller may identify any one transmission coil 140 that interlinks most magnetic fields with the repeater 310 depending on a position of the moving module 200. Then the controller may selectively supply voltage to the identified transmission coil 140, and the user terminal 2 may be charged by receiving a magnetic field generated by the identified transmission coil 140 through the repeater 310.

Specifically, the controller may identify a position of the moving module 200, identify any one transmission coil 140 corresponding to the position of the moving module 200 with reference to a memory, and supply voltage to the identified transmission coil 140.

To detect a position of the moving module 200, the wireless charging device 1 according to the present disclosure may further include a position sensor. The position sensor may be embodied as different structures capable of detecting a position of the moving module 200 that moves on the power transmitting module 100.

For example, the position sensor may be embodied as a photoelectric sensor.

Referring to FIG. 18, the position sensor may include a light-emitting element 410 that is arranged side by side along one side of the sliding groove 111, and a light-receiving element 420 that is arranged side by side along the other side of the sliding groove 111. The light-emitting element 410 and the light-receiving element 420 are provided in pairs, and any one light-emitting element 410 may irradiate laser light, LED light and the like to a light-receiving element 420 facing any one light-emitting element 410.

The light-receiving element 420 may be any element that detects light irradiated from the light-emitting element 410, and may be embodied as a photodiode. The light-receiving element 420 may output a high signal H at a time when light is detected, and output a low signal L at a time when light is not detected.

The controller may detect a position of the moving module 200, based on an output value of the light-receiving element 420. Referring back to FIG. 18, the light irradiated from the light-emitting element 410 may not reach light-receiving elements 420a arranged in a position where the moving module 200 is placed, among a plurality of light-receiving elements 420 arranged side by side along the sliding groove 111.

Accordingly, the light-receiving elements 420a arranged in the position where the moving module 200 is placed may output a low signal L, and the controller may detect the position of the moving module 200, based on the position of the light-receiving elements 420a outputting the low signal L.

FIG. 18 shows a position sensor embodied as a photoelectric sensor. Certainly, the position sensor may be embodied as different sensors capable of detecting a position of the moving module 200.

When the position sensor detects a position of the moving module 200, the controller may identify any one transmission coil 140 corresponding to the position of the moving module 200 with reference to a memory, and supply voltage to the identified transmission coil 140.

To this end, identification information of a transmission coil 140 corresponding to a position value of the moving module 200 may be stored in advance in the memory. Referring to FIG. 17, identification information of a transmission coil 140, corresponding to a position value within a predetermined left range, may be stored in advance as identification information of a first left coil 140a in the memory. Additionally, identification information of a transmission coil 140, corresponding to a position value within a predetermined central range, may be stored in advance as identification information of a second coil 140b in the memory. Further, identification information of a transmission coil 140, corresponding to a position value within a predetermined right range, may be stored in advance as identification information of a first right coil 140a in the memory.

Accordingly, when identifying the position of the moving module 200 in the predetermined left range, the controller may supply voltage to the first left coil 140a to transmit power through the first left coil 140a. Additionally, when identifying the position of the moving module 200 in the predetermined central range, the controller may supply voltage to the second coil 140b to transmit power through the second coil 140b. Further, when identifying the position of the moving module 200 in the predetermined right range, the controller may supply voltage to the first right coil 140a to transmit power through the first right coil 140a.

That is, according to the present disclosure, since voltage is selectively supplied to any one transmission coil 140, based on a position of the moving module 200 that moves along with the user terminal 2, the user terminal 2 is charged through any one transmission coil 140 corresponding to a position of the user terminal 2 without an additional electromagnetic operation for recognizing the user terminal 2.

Thus, according to the present disclosure, since time for the electromagnetic operation for recognizing the user terminal 2 is not needed, an operation of charging the user terminal 2 may start very quickly.

Described above is the examples of the controller's identification of any one transmission coil 140 corresponding to a position of the moving module 200 and supply of voltage to the transmission coil 140 without the electromagnetic operation for recognizing the user terminal 2.

However, the controller may identify a coil group corresponding to a position of the moving module 200, perform an electromagnetic operation for recognizing an actual position of the user terminal 2 through the identified coil group, and then supply voltage to any one transmission coil 140 capable of transmitting power to the user terminal 2 at maximum efficiency. In other words, the controller may electromagnetically identify any one transmission coil 140 that has maximum intensity of a magnetic coupling with the reception coil 2a in the user terminal 2, and supply voltage to the transmission coil 140.

Specifically, the controller may identify a coil group corresponding to a position of the moving module 200, transmit a request signal through a plurality of transmission coils 140 included in the coil group, and receive a response signal from the user terminal 2 through the plurality of transmission coils 140 included in the coil group. Then the controller may identify any one transmission coil 140 having the highest intensity of a magnetic coupling with the reception coil 2a, among the plurality of transmission coils 140 included in the coil group, based on the received response signal.

The controller's operation is specifically described with reference to FIG. 19. FIG. 19 shows the moving module 200 and the plurality of transmission coils 140 only, for description a position relationship between the moving module 200 and each transmission coil 140. Additionally, hereafter, suppose that the plurality of transmission coils 140 are arranged from left to right, i.e., from coil 1 to coil 7 141, 142, 143, 144, 145, 146, 147 in the order of arrangement.

Coil 1-coil 3 141, 142, 143 may be grouped into coil group A, coil 2-coil 4 142, 143, 144 may be grouped into coil group B, coil 3-coil 5 143, 144, 145 may be grouped into coil group C, coil 4-coil 6 144, 145, 146 may be grouped into coil group D, and coil 5-coil 7 145, 146, 147 may be grouped into coil group E, in advance.

Additionally, identification information of a coil group corresponding to a position value of the moving module 200 may be stored in advance in the memory. Accordingly, the controller may identify a coil group corresponding to a position of the moving module 200 with reference to the memory.

For example, when the moving module 200 is at the center of the power transmitting module 100, the controller may identify a coil group corresponding to the position of the moving module 200 as coil group C. Then the controller may transmit a request signal through coil 3-coil 5 143, 144, 145 included in coil group C.

The request signal transmitted through coil 3-coil 5 143, 144, 145 may be supplied to the reception coil 2a of the user terminal 2, and the user terminal 2 may transmit a repose signal with respect to the request signal through the reception coil 2a.

The controller may receive each response signal in relation to the request signal transmitted through coil 3-coil 5 143, 144, 145, and based on intensity of each response signal, identify any one transmission coil 140 that has maximum intensity of a magnetic coupling with the reception coil 2a.

On the other hand, in order to compare the intensity of each response signal, the response signals should not overlap in time. Accordingly, the controller may transmit a request signal consecutively through each of the plurality of transmission coils 140 included in a coil group for a period where response signals do not overlap, and receive a response signal output from the reception coil 2a in the user terminal 2 consecutively.

In the above example, the controller may transmit a request signal to coils 3 to 5 (143, 144, 145) consecutively for a period that does not overlap with each other. Specifically, the controller may supply ping voltage consecutively to coils 3 to 5 (143, 144, 145) and transmit a request signal consecutively through each of coils 3 to 5 (143, 144, 145).

Accordingly, after receiving a response signal in relation to a request signal transmitted through coil 3 (143), the controller may receive a response signal in relation to a request signal transmitted through coil 4 (144), and after receiving the response signal corresponding to the request signal transmitted through coil 4 (144), receive a response signal in relation to a request signal transmitted through coil 5 (145).

The controller may compare intensity of each of the consecutively received response signals, and identify a request signal triggering a response signal of maximum intensity and any one transmission coil 140 having transmitted the request signal.

For example, when the moving module 200 is placed in the center of the power transmitting module 100, the controller may identify a transmission coil 140 to which ping voltage is supplied when a response signal of maximum intensity is received as coil 4 (144).

As any one transmission coil 140 is identified using the above method, the controller may supply voltage to the identified transmission coil 140 to transmit power through the transmission coil 140.

That is, according to the present disclosure, a position of the user terminal 2 may be approximately determined based on a position of the moving module 200 that moves along with the user terminal 2, and an operation for recognizing the user terminal 2 may be performed only through a coil group corresponding to the position of the moving module 200 to identify any one transmission coil 140 capable of transmitting maximum power to the user terminal 2. Thus, an actual position of the user terminal 2 is rapidly determined, and the user terminal 2 is charged through any one transmission coil 140 corresponding to the actual position of the user terminal 2.

In conclusion, according to the present disclosure, even if the number of transmission coils 140 increases, an actual position of the user terminal 2 may be quickly determined, such that the user terminal 2 rapidly starts to be charged, and regardless of a position of the user terminal 2, power may always be transmitted at maximum efficiency.

The embodiments are described above with reference to a number of illustrative embodiments thereof. However, embodiments are not limited to the embodiments and drawings set forth herein, and numerous other modifications and embodiments can be drawn by one skilled in the art without departing from the technical spirit of the disclosure. Further, the effects and predictable effects based on the configurations in the disclosure are to be included within the range of the disclosure though not explicitly described in the description of the embodiments.

The invention claimed is:

1. A wireless charging device, comprising:
a power transmitting module comprising a plurality of transmission coils arranged side by side, therein;
a terminal supporting module comprising a repeater therein, and disposed at a slant with respect to an upper surface of the power transmitting module on the upper surface of the power transmitting module;
a moving module configured to move the terminal supporting module along a direction in which the transmission coils are arranged; and
a controller configured to supply a voltage to any one of the plurality of transmission coils depending on a position of the moving module.

2. The wireless charging device of claim 1, wherein the power transmitting module comprises a case, and a planar core disposed in the case, and
wherein the plurality of transmission coils are arranged side by side on the planar core.

3. The wireless charging device of claim 1, wherein the plurality of transmission coils comprise a plurality of first coils spaced from each other on an identical horizontal surface, and at least one second coil disposed on the plurality of first coils to partially overlap the plurality of first coils.

4. The wireless charging device of claim 1, wherein the plurality of transmission coils are spaced side by side at regular intervals.

5. The wireless charging device of claim 1, wherein the moving module is disposed on the upper surface of the power transmitting module, and is configured to slide along the direction in which the plurality of transmission coils are arranged.

6. The wireless charging device of claim 1, wherein a sliding groove is formed on the upper surface of the power transmitting module, and extends along the direction in which the transmission coils are arranged, and
wherein the moving module is coupled to the sliding groove, and is configured to slide along the direction in which the transmission coils are arranged.

7. The wireless charging device of claim 1, wherein the terminal supporting module is coupled to the moving module in a way that the terminal supporting module rotates in a plane.

8. The wireless charging device of claim 1, wherein a depression is formed on the upper surface of the moving module, and
wherein the terminal supporting module is inserted into the depression and is configured to rotate in a plane.

9. The wireless charging device of claim 8, wherein a plurality of rotate grooves are formed on an inner circumferential surface of the depression and arranged side by side along a circumference of the depression, and
wherein the terminal supporting module is coupled to the plurality of rotate grooves and is configured to rotate in the plane by a unit angle.

10. The wireless charging device of claim 9, wherein the terminal supporting module comprises a plurality of rotate projections that are respectively coupled to the plurality of rotate grooves.

11. The wireless charging device of claim 1, wherein the terminal supporting module comprises a rotating plate coupled to the moving module in a way that the terminal supporting module rotates in a plane, and
wherein a supporting plate is coupled to the rotating plate in a way that the supporting plate rotates vertically with respect to the rotating plate.

12. The wireless charging device of claim 11, wherein the rotating plate is inserted into a storage groove that is formed on a rear surface of the supporting plate.

13. The wireless charging device of claim 1, wherein a repeater projected area formed on the upper surface of the power transmitting module is greater than an area formed by each transmission coil when the repeater is projected onto the upper surface of the power transmitting module vertically.

14. The wireless charging device of claim 1, wherein at the terminal supporting module's maximum slant with respect to the upper surface of the power transmitting module, a repeater projected area formed on the upper surface of the power transmitting module is greater than an area formed by each transmission coil when the repeater is projected onto the upper surface of the power transmitting module vertically.

15. The wireless charging device of claim 1, wherein the controller identifies a position of the moving module, identifies any one transmission coil corresponding to the position of the moving module with reference to a memory, and supplies the voltage to the identified transmission coil.

16. The wireless charging device of claim 1, wherein the controller identifies a coil group corresponding to a position of the moving module, transmits a request signal through the plurality of transmission coils included in the identified coil group, and supplies the voltage to any one of the plurality of transmission coils included in the coil group, based on a response signal received through the plurality of transmission coils included in the coil group.

17. The wireless charging device of claim 16, wherein the controller transmits the request signal consecutively through each of the plurality of transmission coils included in the coil group for a period that does not overlap with each other, and based on an intensity of the response signal output from a reception coil in a user terminal, supplies the voltage to any one of the plurality of transmission coils included in the coil group.

18. The wireless charging device of claim 1, wherein the slant of the terminal supporting module with respect to the upper surface of the power transmitting module is adjustable.

19. A wireless charging device, comprising:
a power transmitting module comprising a plurality of transmission coils sequentially arranged in an arrangement direction;
a terminal supporting module comprising a repeater therein, and disposed on an upper surface of the power transmitting module;
a moving module configured to move the terminal supporting module along the arrangement direction; and
a controller configured to supply a voltage to one transmission coil among the plurality of transmission coils that is closest to a position of the moving module.

20. The wireless charging device of claim 19, further comprising a sensor included in the power transmitting module, and configured to detect the position of the moving module.

* * * * *